US012768823B2

(12) United States Patent
Hattori et al.

(10) Patent No.: US 12,768,823 B2
(45) Date of Patent: Oct. 20, 2026

(54) METHOD FOR ANALYZING ACYLCARNITINE AND ACYLCARNITINE ANALYZER

(71) Applicants: Shimadzu Corporation, Kyoto (JP); NATIONAL UNIVERSITY CORPORATION SHIMANE UNIVERSITY, Shimane (JP)

(72) Inventors: Takanari Hattori, Kyoto (JP); Jun Watanabe, Kyoto (JP); Misa Tanaka, Yokohama (JP); Hironori Kobayashi, Matsue (JP); Yoshitomo Notsu, Izumo (JP)

(73) Assignees: SHIMADZU CORPORATION, Kyoto (JP); NATIONAL UNIVERSITY CORPORATION SHIMANE UNIVERSITY, Shimane (JP)

( * ) Notice: Subject to any disclaimer, the term of this patent is extended or adjusted under 35 U.S.C. 154(b) by 677 days.

(21) Appl. No.: 18/023,935

(22) PCT Filed: Aug. 24, 2021

(86) PCT No.: PCT/JP2021/031010
§ 371 (c)(1),
(2) Date: Feb. 28, 2023

(87) PCT Pub. No.: WO2022/045142
PCT Pub. Date: Mar. 3, 2022

(65) Prior Publication Data
US 2023/0324349 A1 Oct. 12, 2023

(30) Foreign Application Priority Data
Aug. 31, 2020 (JP) ................................ 2020-145294

(51) Int. Cl.
*G01N 30/72* (2006.01)
*G01N 30/88* (2006.01)

(52) U.S. Cl.
CPC ..... *G01N 30/72* (2013.01); *G01N 2030/8818* (2013.01); *G01N 2030/8822* (2013.01); *G01N 2560/00* (2013.01)

(58) Field of Classification Search
None
See application file for complete search history.

(56) References Cited

U.S. PATENT DOCUMENTS

2020/0043162 A1 2/2020 Kumagai et al.

FOREIGN PATENT DOCUMENTS

| | | | |
|---|---|---|---|
| CN | 110794025 | A | 2/2020 |
| JP | 2008-101960 | A | 5/2008 |
| JP | 2018-044826 | A | 3/2018 |

OTHER PUBLICATIONS

Jan. 18, 2025, Chinese Office Action issued for related CN Application No. 202180053324.X.

(Continued)

*Primary Examiner* — Xiaoyun R Xu
(74) *Attorney, Agent, or Firm* — Paratus Law Group, PLLC

(57) ABSTRACT

One mode of a method for analyzing acylcarnitine according to the present invention is a method for analyzing C5 acylcarnitine using a tandem mass spectrometer, the method including: a measurement step of performing MRM measurement on a specimen according to at least one of MRM transitions of m/z 246>187, m/z 246>57, m/z 246>41, and m/z 246>29; and a processing step of distinguishing between isovalerylcarnitine and pivaloylcarnitine which is an isomer of isovalerylcarnitine in the specimen or determining whether or not C5 acylcarnitine in the specimen includes pivaloylcarnitine, using a measurement result (Continued)

obtained in the measurement step. This makes it possible to satisfactorily distinguish between isovalerylcarnitine and pivaloylcarnitine, which have been conventionally difficult to distinguish.

8 Claims, 18 Drawing Sheets

(56) References Cited

OTHER PUBLICATIONS

Aug. 17, 2024, Chinese Office Action issued for related CN Application No. 202180053324.X.
Jan. 25, 2024, European Search Report issued for related EP Application No. 21861567.2.
Maeda et al., Determination of 3-hydroxyisovalerylcarnitine and other acylcarnitine levels using liquid chromatography-tandem mass spectrometry in serum and urine of a patient with multiple carboxylase deficiency, Journal of Chromatography B, Dec. 4, 2007, pp. 154-159, vol. 870.
Maeda et al., Simultaneous quantification of acylcarnitine isomers containing dicarboxylic acylcarnitines in human serum and urine by high-performance liquid chromatography/electrospray ionization tandem mass spectrometry, Rapid Communication in Mass Spectrometry, 2007, pp. 799-806, vol. 21.
Forni et al., Rapid determination of C4-acylcarnitine and C5-acylcarnitine isomers in plasma and dried blood spots by UPLC-MS/MS as a second tier test following flow-injection MS/MS acylcarnitine profile analysis, Molecular Genetics and Metabolism, Jun. 10, 2010, pp. 25-32, vol. 101.
Apr. 17, 2023, Chinese Office Action issued for related CN Application No. 202111409904.6.
Nomachi et al., FY 2008 (fourth year) implementation results of newborn infant mass screening using tandem mass spectrometer, Annual Report of Sapporo Municipal Health Research Institute, 2009, pp. 42-48, vol. 36.
Shigematsu, The Realities of Newborn Screening by Tandem Mass Spectrometry in Japan, The Japan Society for Mass Spectrometry, Journal of the Mass Spectrometry Society of Japan, 2016, pp. 127-131, vol. 64, No. 4.
Jan. 24, 2023, Japanese Decision to Grant a Patent issued for related JP Application No. 2022-545644.
Nov. 22, 2021, Written Opinion issued for related PCT Application No. PCT/JP2021/031010.
May 13, 2025, Chinese Office Action issued for related CN Application No. 202180053324.X.
Jun. 3, 2025, European Office Action issued for related EP Application No. 21861567.2.

(a) Isovalerylcarnitine (b) Pivaloylcarnitine (a) 10 ppb i-C5

(b) 10 ppb p-C5

C6-OH

METHOD FOR ANALYZING ACYLCARNITINE AND ACYLCARNITINE ANALYZER

CROSS REFERENCE TO PRIOR APPLICATION

This application is a National Stage Patent Application of PCT International Patent Application No. PCT/JP2021/031010 (filed on Aug. 24, 2021) under 35 U.S.C. § 371, which claims priority to Japanese Patent Application No. 2020-145294 (filed on Aug. 31, 2020), which are all hereby incorporated by reference in their entirety.

TECHNICAL FIELD

The present invention relates to a method for analyzing acylcarnitine and an analyzer using the method.

BACKGROUND ART

Newborn infant screening tests are widely performed in order to detect and treat congenital metabolic disorders and the like in newborn infants at an early stage. Recently, with the rapid development of mass spectrometry technology, a newborn mass screening test using a tandem mass spectrometer has also become widespread, and is very effective for early detection of congenital metabolic disorders in newborn infants (refer to Non Patent Literatures 1 and 2).

One of such newborn mass screening tests includes acylcarnitine analysis for diagnosing organic acid/fatty acid metabolism disorders. Acylcarnitine is a combination of carnitine existing in the body and an acyl group derived from an organic acid or a fatty acid, and acylcarnitines of various structures having different chain lengths of acyl groups are analyzed.

As disclosed in Non Patent Literature 2, in general acylcarnitine analysis, multiple reaction monitoring (MRM) measurement in a tandem mass spectrometer is used to perform quantitative analysis in which precursor ions derived from acylcarnitine molecules having various mass-to-charge ratios (formally denoted as "m/z" in italics, but the widely used depiction of "mass-to-charge ratio" or "m/z" is used herein) according to the chain length of acyl groups are combined with characteristic product ions at m/z 85 (exactly 84.95).

CITATION LIST

Non Patent Literature

Non Patent Literature 1: Shosuke Nomachi, 8 others, "FY 2008 (fourth year) implementation results of newborn infant mass screening using tandem mass spectrometer", Annual Report of Sapporo Municipal Health Research Institute, Vol. 36, 2009, pp. 42-48

Non Patent Literature 2: Yosuke Shigematsu, "Reality of newborn infant Mass Screening by Mass Spectrometry", The Japan Society for Mass Spectrometry, Journal of the Mass Spectrometry Society of Japan, Vol. 64, No. 4, 2016, pp. 127-131

SUMMARY OF INVENTION

Technical Problem

However, the conventional method for analyzing acylcarnitine has the following problems.

In the newborn mass screening test, it is necessary to quickly analyze a large amount of specimen, and therefore separation by liquid chromatograph (LC) is not performed, and a combination of flow injection analysis (FIA) and MRM measurement is used. Therefore, isomers having the same MRM transition (a combination of the mass-to-charge ratio of precursor ions and the mass-to-charge ratio of product ions) cannot be distinguished.

For example, as pointed out in Non Patent Literature 2, C5 acylcarnitine (acylcarnitine having an acyl group having 5 carbon atoms) includes isomers such as isovalerylcarnitine and pivaloylcarnitine. Isovalerylcarnitine is a metabolite associated with congenital diseases, whereas pivaloylcarnitine is a metabolite derived from a drug, mainly from a pivoxyl group included in some antibacterial agents. Therefore, even in a case where an abnormal increase in C5 acylcarnitine is detected by acylcarnitine analysis and a positive result is obtained by screening, there is a possibility that the abnormal increase results from not a congenital factor to be originally detected, but the screening is a false positive due to the influence of a drug for which detection is not required. Since the antibacterial agent is a drug prescribed at a relatively high frequency for newborn infants, such false positives derived from this drug are relatively common.

For this reason, when the screening is positive for C5 acylcarnitine it is necessary to perform an additional test by another analysis method such as liquid chromatograph mass spectrometry to determine whether it is because of a congenital factor. In a general newborn screening test, a sample is prepared by collecting blood from a newborn infant, and thus performing the additional test as described above is a physical burden for the newborn infant. In addition, a positive screening test imposes a considerable psychological burden on the parents of the newborn infant. Therefore, it is important to reduce false positives as much as possible and to be able to notify a parent that there is a possibility of a temporary false positive derived from a drug if an additional test is necessary.

The problem described above is not limited to C5 acylcarnitine, and the same applies to, for example, C4 acylcarnitines including butyrylcarnitine known as a metabolite associated with congenital diseases such as short chain acyl-CoA dehydrogenase deficiency and glutaric acidemia type 11 and isobutyrylcarnitine, an isomer of butyrylcarnitine.

In addition, while the molecular weights are exactly the same in the case of the isomers described above, when the molecular weights are not the same but are very close, different acylcarnitines may fail to be distinguished by mass due to the restriction of the performance of the mass spectrometer.

For example, glutarylcarnitine and hydroxyhexanoylcarnitine, which are known as metabolites associated with congenital diseases such as glutaric acidemia type I, are different in composition formula, but they have the same integer mass and cannot be distinguished by a mass spectrometer having a relatively low mass resolution. Further, malonylcarnitine known as a metabolite associated with congenital diseases such as malonic acidemia and 3-hydroxybutyrylcarnitine known as a metabolite associated with congenital diseases such as 3-hydroxyacyl-CoA dehydrogenase deficiency have different composition formulas, but they have the same integer mass, and cannot be distinguished by a mass spectrometer having a relatively low mass resolution.

The distinction of a plurality of acylcarnitines having the same integer mass is typically possible in a liquid chromatograph mass spectrometer, but is inefficient and unsuitable for a screening test.

One mode of the present invention has been made to solve the above problems, and its object is to provide a method and an analyzer for analyzing acylcarnitine capable of distinguishing acylcarnitines between one due to a congenital factor included in C5 acylcarnitine and its isomer mainly derived from a drug in a newborn mass screening test or the like.

Another mode of the present invention has been made to solve the above problems, and its object is to provide a method and an analyzer for analyzing acylcarnitine capable of efficiently and accurately distinguishing acylcarnitines having exactly or substantially the same mass in a newborn mass screening test or the like.

Solution to Problem

One mode of a method for analyzing acylcarnitine according to the present invention made to solve the above problems is a method for analyzing C5 acylcarnitine (acylcarnitine having an acyl group having 5 carbon atoms) using a tandem mass spectrometer, the method including:

- a measurement step of performing multiple reaction monitoring (MRM) measurement on a specimen according to at least one of MRM transitions of m/z 246>187, m/z 246>57, m/z 246>41, and m/z 246>29; and
- a processing step of distinguishing between isovalerylcarnitine and pivaloylcarnitine which is an isomer of isovalerylcarnitine in the specimen or determining whether or not C5 acylcarnitine in the specimen includes pivaloylcarnitine, using a measurement result obtained in the measurement step.

Another mode of the method for analyzing acylcarnitine according to the present invention made to solve the above problems is a method for analyzing acylcarnitine for distinguishing different acylcarnitines having substantially the same mass using a tandem mass spectrometer, the method including:

- a measurement step of perforating a first MRM measurement for an RM transition with maximum signal intensity and a second MRM measurement for an MRM transition different from the first MRM measurement on a specimen to acquire respective signal intensity of ions derived from a target acylcarnitine; and
- a processing step of distinguishing the different acylcarnitines or determining whether or not the target acylcarnitine in the specimen includes any of the different acylcarnitines, based on a confirmation ion ratio which is a ratio of a signal intensity obtained by the first MRM measurement to a signal intensity obtained by the second MRM measurement.

Still other mode of the method for analyzing acylcarnitine according to the present invention made to solve the above problems is a method for analyzing acylcarnitine for distinguishing different acylcarnitines having substantially the same mass by using a tandem mass spectrometer, the method including:

- a measurement step of performing MRM measurement on a specimen for specific MRM transitions different from each other determined for the different acylcarnitines to acquire respective signal intensity of ions derived from a target acylcarnitine; and
- a processing step of distinguishing the different acylcarnitines, or determining whether or not the target acylcarnitine in the specimen includes any of the different acylcarnitines, based on signal intensity for a specific MRM transition obtained in the measurement step.

Still another mode of the method for analyzing acylcarnitine according to the present invention made to solve the above problems is a method for analyzing acylcarnitine for distinguishing different acylcarnitines having substantially the same mass by using a tandem mass spectrometer, the method including:

- a measurement step of performing MRM measurement on a specimen while changing collision energy with a specific MRM transition to acquire respective signal intensity of ions derived from a target acylcarnitine; and
- a processing step of distinguishing the different acylcarnitines or determining whether or not the target acylcarnitine in the specimen includes any of the different acylcarnitines, based on collision energy dependency of ionic intensity obtained in the measurement step.

In addition, one mode of an acylcarnitine analyzer according to the present invention made to solve the above problems is an acylcarnitine analyzer including:

- a measurement unit which is a tandem mass spectrometer configured to perform multiple reaction monitoring (MRM) measurement on a specimen according to at least one of MRM transitions of m/z 246>187, m/z 246>57, m/z 246>41, and m/z 246>29; and
- a processing unit configured to distinguish between isovalerylcarnitine and pivaloylcarnitine which is an isomer of isovalerylcarnitine in the specimen, or to determine whether or not C5 acylcarnitine (acylcarnitine having are acyl group having 5 carbon atoms) in the specimen includes pivaloylcarnitine, using a measurement result obtained by the measurement unit.

Another mode of the acylcarnitine analyzer according to the present invention made in order to solve the above problems is an acylcarnitine analyzer including:

- a measurement unit which is a tandem mass spectrometer configured to perform, on a specimen, a first MRM measurement for an MRM transition with maximum signal intensity and a second MRM measurement for an MRM transition different from the first MRM measurement; and
- a processing unit configured to distinguish different acylcarnitines having substantially the same mass or to determine whether or not a target acylcarnitine in the specimen includes any of the different acylcarnitines, based on a confirmation ion ratio which is a ratio of a signal intensity obtained by the first MRM measurement and a signal intensity obtained by the second MRM measurement by the measurement unit.

Still another mode of the acylcarnitine analyzer according to the present invention made to solve the above problems is an acylcarnitine analyzer including:

- a measurement unit which is a tandem mass spectrometer configured to perform MRM measurement on a specimen for specific MRM transitions different from each other respectively determined for different acylcarnitines; and
- a processing unit configured to distinguish different acylcarnitines having substantially the same mass or to determine whether or not a target acylcarnitine in the specimen includes any of the different acylcarnitines, based on signal intensity liar a specific MRM transition obtained by the measurement unit.

Still another mode of the acylcarnitine analyzer according to the present invention made to solve the above problems is an acylcarnitine analyzer including:

a measurement unit which is a tandem mass spectrometer configured to perform MRM measurement on a specimen while changing collision energy according to a specific MRM transition; and a processing unit configured to distinguish different acylcarnitines having substantially the same mass or to determine whether or not a target acylcarnitine in the specimen includes any of the different acylcarnitines, based on collision energy dependency of ionic intensity obtained by the measurement unit.

Herein, "different acylcarnitines having substantially the same mass" may be acylcarnitines having exactly the same mass such as isomers, or acylcarnitines having different masses where the difference cannot be distinguished by the mass spectrometer used. In the latter case, for example, the acylcarnitines have the same integer mass.

In the above modes of the present invention, the tandem mass spectrometer may be typically a triple quadrupole mass spectrometer or a quadrupole-time-of-flight (Q-TOF) mass spectrometer.

Herein, the MRM measurement by the MRM transition of m/z A>B means a measurement of selecting precursor ions having the value of m/z A by a front mass separator, and detecting product ions having the value of m/z B derived from the precursor ions having m/z A. Therefore, when the tandem mass spectrometer configured to perform the MRM measurement is a triple quadrupole mass spectrometer, m/z A precursor ions are selectively passed through the front quadrupole mass filter, and product ions having m/z B derived from the m/z A precursor ions are selectively passed through the rear quadrupole mass filter for detection. When the tandem mass spectrometer configured to perform the MRM measurement is a Q-TOF mass spectrometer, precursor ions having m/z A are selectively passed through the front quadrupole mass filter (Q), and product ions including m/z B among product ions derived from the precursor ions having m/z A are detected by a rear time-of-flight mass separator (TOF) and ion detector.

The mass-to-charge ratio values m/z 246, m/z 187, m/z 57, m/z 41, and m/z 29 in the MRM transition according to the one mode of the present invention and the mass-to-charge ratio value m/z 85 in the MRM transition described later are expressed by integer values, but when expressed to the second decimal place, these values are expressed as m/z 246.15, m/z 187.05, m/z 57.00, m/z 41.10, m/z 29.15, and m/z 84.95 respectively, and in general, these are the most intended values (that is, values to be targets).

However, the mass-to-charge ratio value of ions actually selected in a mass separator such as a quadrupole mass filter naturally depends on the performance of the apparatus used. Therefore, in the present description and claims, for example, in a case of describing m/z 246, although the mass-to-charge ratio value of the most intended ion is m/z 246.15, ions within a range of m/z 246.15±0.1, m/z 246.15±0.2, m/z 246.15±0.3, or m/z 246.15±0.4 may also be included in the intended ion. In other words, when the mass-to-charge ratio value is represented by an integer value, ions to be expressed as m/z 246 may be included, and ions to be expressed as m/z 245 and m/z 247 cannot be included. The same applies to other mass-to-charge ratio values.

Advantageous Effects of Invention

In one mode of the method for analyzing acylcarnitine and the acylcarnitine analyzer according to the present invention, one or more of four types of product ions of m/z 187, m/z 57, m/z 41, and m/z 29, which have lower detection sensitivity than that of the product ions capable of being detected with high sensitivity, which is m/z 85 generally used for quantification of acylcarnitine, are used for distinction or determination of pivaloylcarnitine. Of course, these four types of product ions and the conventionally used m/z 85 product ions may be used in combination.

According to one mode of the method for analyzing acylcarnitine and the acylcarnitine analyzer according to the present invention, it is possible to distinguish between isovalerylcarnitine and pivaloylcarnitine, which are conventionally difficult to distinguish, or to determine whether or not the detected C5 acylcarnitine may include pivaloylcarnitine, without performing component separation by a column of liquid chromatograph. This can reduce false positives in screening tests for C5 acylcarnitine. When a positive result is obtained in a screening test for C5 acylcarnitine, it is possible to notify the user that the factor may be pivaloylcarnitine derived from a drug. As a result, it is possible to reduce the physical burden on a newborn infant, and it is possible to reduce the psychological burden on the parents of the newborn infant who has become positive in the screening test.

According to another mode of the method for analyzing acylcarnitine and the acylcarnitine analyzer according to the present invention, it is possible to easily distinguish between acylcarnitine isomers having exactly the same molecular weight, which are conventionally difficult to distinguish, or to easily distinguish between acylcarnitines having the same integer mass, this distinction being difficult due to restrictions on mass resolution of the mass spectrometer, without performing component separation by a column of liquid chromatograph. This can efficiently and accurately perform a screening test for congenital metabolic disorders or the like due to genetic factors.

DESCRIPTION OF EMBODIMENTS

Hereinafter, an embodiment of the method for analyzing acylcarnitine and the acylcarnitine analyzer according to the present invention will be described with reference to the accompanying drawings.

Configuration of Acylcarnitine Analyzer of Present Embodiment

Figure 1:
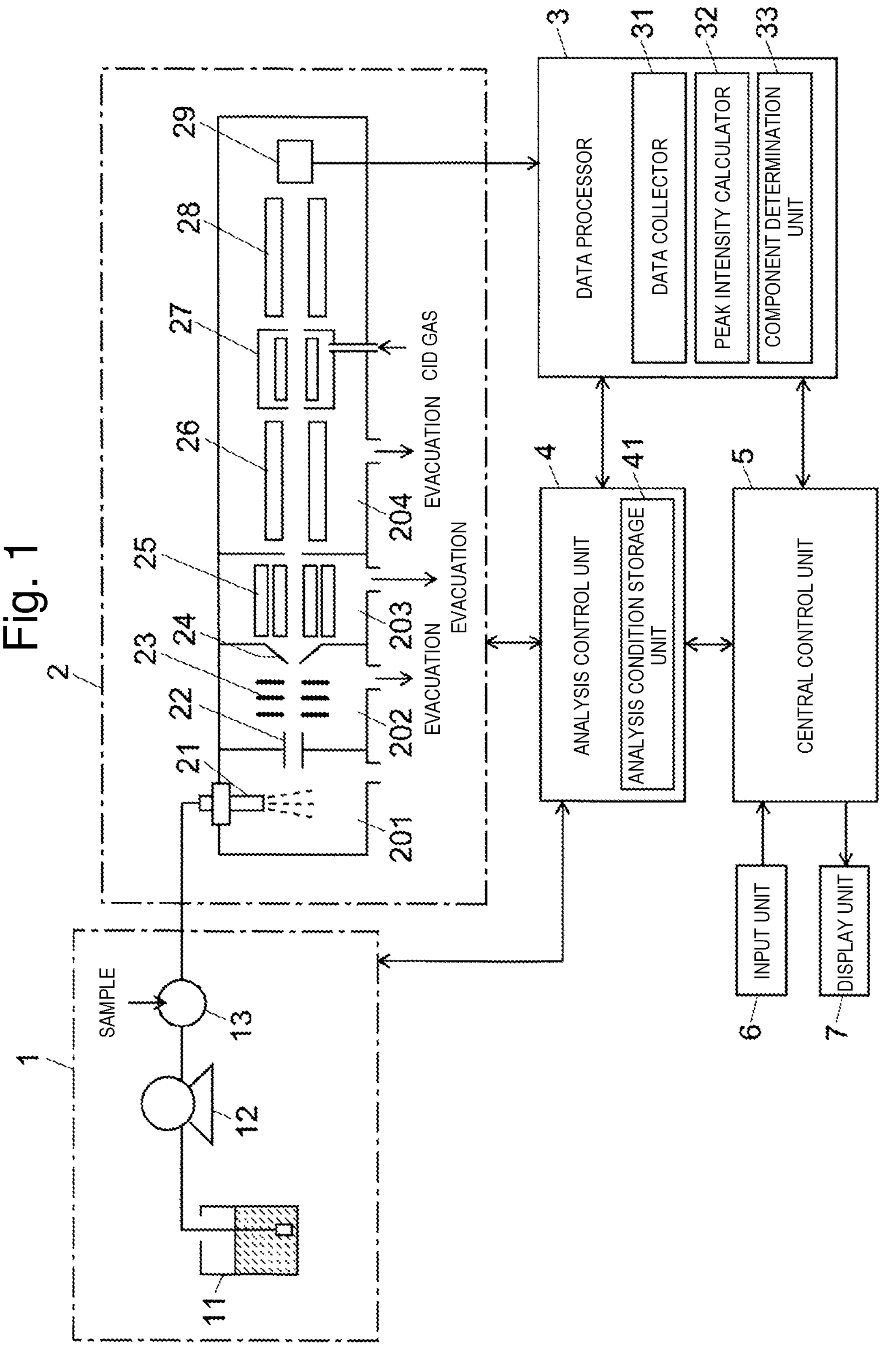
FIG. 1 is a configuration diagram of a main part of an embodiment of an acylcarnitine analyzer according to the present invention.

FIG. 1 is a schematic structural diagram of an embodiment of an acylcarnitine analyzer according to the present invention.

This acylcarnitine analyzer is mainly used for acylcarnitine analysis for diagnosing congenital organic acid/fatty acid metabolism disorders in a newborn infant screening test. The analyzer includes a sample introduction unit 1, a measurement unit 2, a data processor 3, an analysis control unit 4, a central control unit 5, an input unit 6, and a display unit 7.

The sample introduction unit 1 is an apparatus configured to perform sample introduction by the FIA method, and includes a mobile phase container 11 in which a mobile phase (solvent) is stored, a liquid supply pump 12 configured to feed the mobile phase after sucking the mobile phase from the mobile phase container 11, and an injector 13 configured to supply a sample into the mobile phase. In general, units in liquid chromatograph can be used as the components. Although not illustrated, an autosampler is typically connected to the injector 13 in order to sequentially analyze a large number of specimens. In the case of a general newborn screening test, as described in Non Patent Literature 2, the sample is extracted and prepared from filter paper blood. However, the sample is not limited to the filter paper blood, and may be prepared from urine or other body fluids.

The measurement unit 2 is a triple quadrupole mass spectrometer which is a type of tandem mass spectrometer, and includes an ionization chamber 201 maintained at substantially atmospheric pressure, and a first intermediate vacuum chamber 202, a second intermediate vacuum chamber 203, and a high vacuum chamber 204 that are respectively evacuated by a vacuum pump (not illustrated). The ionization chamber 201 is provided with an ESI spray 21 that performs ionization by an electrospray ionization (ESI) method, and the ionization chamber 201 and the first intermediate vacuum chamber 202 of the next stage are connected by a desolvation tube 22. An ion guide 23 that transports ions while converging the ions is arranged in the first intermediate vacuum chamber 202, and the first intermediate vacuum chamber 202 and the second intermediate vacuum chamber 203 in the next stage communicate with each other through a small hole formed at the top of a skimmer 24. A multipole ion guide 25 that transports ions while converging the ions is also arranged in the second intermediate vacuum chamber 203.

In the high vacuum chamber 204, a front quadrupole mass filter 26, a collision cell 27, a rear quadrupole mass filter 28, and an ion detector 29 are arranged along the flow of ions. A quadrupole ion guide is arranged inside the collision cell 27. Each of the front quadrupole mass filter 26 and the rear quadrupole mass filter 28 has a function of selectively passing ions having a predetermined mass-to-charge ratio. An inert collision-induced dissociation (CID) gas such as argon is externally introduced into the collision cell 27, and the collision cell 27 has a function of generating product ions by bringing the introduced ions into contact with the CID gas to dissociate the ions.

The data processor 3 is configured to perform processing based on the detection data supplied from the ion detector 29, and includes a data collector 31, a peak intensity calculator 32, and a component determination unit 33 as functional blocks. The analysis control unit 4 is configured to control the operations of the sample introduction unit 1 and the measurement unit 2 according to the analysis condition file stored in the analysis condition storage unit 41. The central control unit 5 is configured to mainly execute overall control and a user interface through the input unit 6, the display unit 7, and the like.

Generally, the entity of the data processor 3, the analysis control unit 4, and the central control unit 5 is a personal computer or a computer called a workstation with higher performance, and the functions of the functional blocks can be achieved by operating dedicated software (computer program) previously installed in the computer on the computer.

Schematic Description of MRM Measurement Operation

In the acylcarnitine analyzer illustrated in FIG. 1, when the acylcarnitine is analyzed, the measurement unit 2 repeatedly performs the MRM measurement for a predetermined MRM transition. An operation in the MRM measurement will be schematically described.

In the sample introduction unit 1, the liquid supply pump 12 sucks the mobile phase from the mobile phase container 11 and feeds the mobile phase to the injector 13 at a substantially constant flow rate. The injector 13 supplies a predetermined amount of sample (specimen) into the mobile phase at a predetermined timing. The sample is carried by the flow of the mobile phase and reaches the ESI spray 21 of the measurement unit 2. The sample diffuses in the front-back direction in the channel until reaching the ESI spray 21. Therefore, the amount of the sample introduced into the ESI spray 21 is initially significantly small, but the amount of the sample increases rapidly, reaches the maximum point, and then decreases rapidly to 0. That is, the concentration distribution of the sample exhibits a peak shape close to a Gaussian distribution over time.

In the ESI spray 21, the sample is nebulized as fine charged droplets into the ionization chamber 201. The charged droplets come into contact with residual gas molecules and split, and the compound molecules in the sample are ionized in the process of vaporizing the solvent in the droplets. The generated ions are sent to the first intermediate vacuum chamber 202 through the desolvation tube 22, and further sent to the high vacuum chamber 204 through the ion guide 23, the small hole of the skimmer 24, and the multipole ion guide 25. Ions derived from the sample are introduced into the front quadrupole mass filter 26, and only ions having a predetermined mass-to-charge ratio corresponding to the voltage applied to the electrodes constituting the front quadrupole mass filter 26 selectively pass as precursor ions. The precursor ions incident on the collision cell 27 come into contact with the CID gas to be dissociated, and various product ions are generated.

The generated various product ions are introduced into the rear quadrupole mass filter 28, and only product ions having a predetermined mass-to-charge ratio corresponding to the voltage applied to the electrodes constituting the rear quadrupole mass filter 28 selectively pass and reach the ion detector 29. The ion detector 29 generates a detection signal corresponding to the amount of incident ions, and detection data digitized by an analog-to-digital converter (not illustrated) is input to the data processor 3.

The analysis control unit 4 is configured to control the measurement unit 2 so that a voltage corresponding to a target MRM transition is applied to each of the electrodes of the front quadrupole mass filter 26 and the rear quadrupole mass filter 28. This control can provide detection data indicating the ionic intensity of product ions having a specific mass-to-charge ratio generated by dissociation of ions corresponding to a specific MRM transition, that is, precursor ions having a specific mass-to-charge ratio among ions derived from the compound contained in the sample.

Principle of Method for Analyzing C5 Acylcarnitine

The principle of a characteristic analysis method in the acylcarnitine analyzer of the present embodiment will be described.

In the measurement unit 2, the precursor ions are dissociated by CID in the collision cell 27, but the mode of dissociation varies depending on the kinetic energy of the precursor ions. This kinetic energy is collision energy (CE). The collision energy is determined by a direct-current potential difference between the inlet end of the collision cell 27 and the front of the collision cell 27 (the front quadrupole mass filter 26 illustrated in FIG. 1, but in some cases, an ion optical element such as another ion lens), and therefore the collision energy is typically indicated by the potential difference. Therefore, the collision energy can be adjusted by the direct current bias voltage applied to one or both of the front quadrupole mass filter 26 and the ion optical element at the front of the front quadrupole mass filter 26.

As described above, when the collision energy is changed, the mode of dissociation of precursor ions changes, and generation patterns of a plurality of product ions change. In order to increase the detection sensitivity, it is desirable to select product ions (that is, MRM transitions) having as large ionic intensity as possible. Therefore, in conventional C5 acylcarnitine analysis, an MRM transition of m/z 246.15>84.95 with the largest ionic intensity has been used as a quantitative ion for determining the presence or absence of the component or calculating the content. However, as described above, at m/z 246.15>84.95, it is not possible to distinguish between isovalerylcarnitine, which is associated with innate metabolic abnormalities, and pivaloylcarnitine, which is predominantly derived from antibacterial agents. Therefore, the inventor of the present invention has experimentally minutely investigated the relationship between collision energy and ionic intensity for various MRM transitions associated with C5 acylcarnitine.

FIGS. 2 to 6 are graphs illustrating experimentally determined relationships between collision energy and peak intensity for isovalerylcarnitine (hereinafter abbreviated as "i-C5" in some cases) and pivaloylcarnitine (hereinafter abbreviated as "p-C5" in some cases) under different MRM transitions, respectively.

The above experiment was performed according to the following procedure.

A 100 μg/L aqueous solution was prepared from each of i-C5 and p-C5 standard products by using ultrapure water, and used as a sample. LCMS-8060 manufactured by Shimadzu Corporation was used as a mass spectrometer, and first, product ion scan measurement was performed on precursor ions (m/z 246.15) common to i-C5 and p-C5 to search for product ions specific to each compound. As a result, specific product ions derived from each compound were not observed, and it was found that there were five types of representative product ions: m/z 187.05, m/z 84.95, m/z 57.00, m/z 41.10, and m/z 29.15, which can provide a somewhat high peak intensity.

Then, for the five types of product ions, the peak intensity when the set value of the collision energy was changed in the range of −100 to −10 V in 5 V steps was measured. The results are illustrated in FIGS. 2 to 6. In FIGS. 2 to 6, in order to easily compare the peak intensity pattern with respect to the change in collision energy, the pattern is normalized such that the maximum value of the peak intensity becomes 1 in each of the peak intensity patterns of i-C5 and p-C5.

Figure 3:
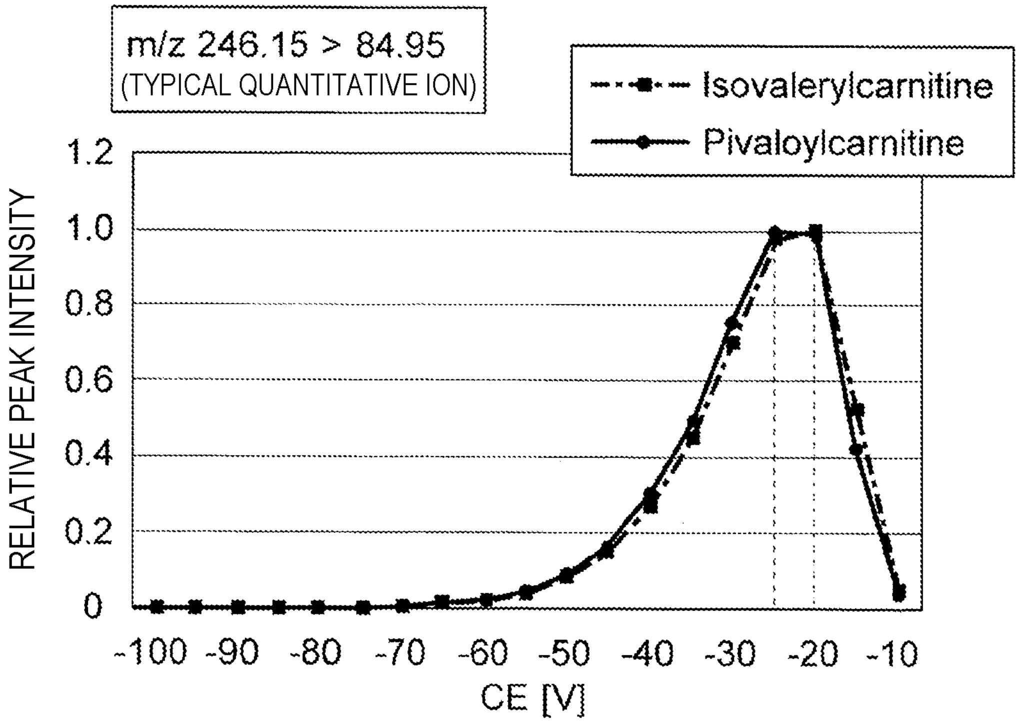
FIG. 3 is a graph illustrating a relationship between collision energy and peak intensity for i-C5 and p-C5 in an MRM transition: m/z 246.15>84.95.

In the MRM transition: m/z 246.15>84.95 illustrated in FIG. 3, which is utilized for the conventional quantification of C5 acylcarnitine, there is little difference in peak intensity pattern between i-C5 and p-C5. Meanwhile, in the three types of MRM transitions: m/z 246.15>57.00, m/z 246.15>41.10, and m/z 246.15>29.15, there is a difference in peak intensity pattern between i-C5 and p-C5. In particular, in m/z 246.15>41.10, there is a clear difference in peak intensity over substantially the entire range of collision energy. In other cases of m/z 246.15>57.00 and m/z 246.15>29.1, there is a sufficient difference in peak intensity depending on collision energy. According to such experimental findings, it is found that it is possible to distinguish between i-C5 and p-C5 by using the difference in peak intensity or peak intensity pattern between i-C5 and p-C5 in these specific MRM transitions.

Specific Example of Method for Distinguishing Between i-C5 and p-C5

As described above, referring to FIGS. 2 to 6, the MRM transition causing the largest difference between i-C5 and p-C5 is m/z 246.15>41.10. Therefore, in the acylcarnitine analyzer of the above embodiment, under the control of the analysis control unit 4, the measurement unit 2 is configured to repeatedly perform the MRM measurement with CE=−22 V and m/z 246.15>84.95 and the MRM measurement with CE=−45 V and m/z 246.15>41.10 on the same unknown sample. The MRM measurement is repeatedly performed from the time point when the sample is supplied by the injector 13 to the time point when a predetermined time elapses. As a result, the data collector 31 stores data constituting a chromatogram waveform indicating the passage of time of the ionic intensity data as each MRM measurement result.

The peak intensity calculator 32 creates a chromatogram waveform corresponding to each of the two types of MRM transitions from the data stored in the data collector 31, and detects a peak on the waveform to provide a peak top value (peak intensity value). Herein, the peak intensity value is used as the signal intensity for calculation processing to be described later, but instead of the peak intensity value, an area value of a peak from a peak start point to an end point may be calculated and used as the signal intensity.

There is almost no difference in signal intensity A1 in the MRM transition of m/z 246.15>84.95 between the case where the C5 acylcarnitine contained in the unknown sample is i-C5 and the case where the C5 acylcarnitine is p-C5. In contrast, there is a sufficient difference in signal intensity A2 in the MRM transition of m/z 246.15>41.10 between the case of i-C5 and the case of p-C5. Thus, the component determination unit 33 is configured to calculate the intensity ratio A2/A1 between the signal intensity A1 in the MRM transition of m/z 246.15>84.95 and the signal intensity A2 in the MRM transition of m/z 246.15>41.10.

Assuming that ions detected in the MRM transition of m/z 246.15>84.95 are quantitative ions and ions detected in the MRM transition of m/z 246.15>41.10 are confirmation ions, the intensity ratio A2/A1 is a so-called confirmation ion ratio. Therefore, hereinafter, the intensity ratio A2/A1 is referred to as confirmation ion ratio.

Figure 5:
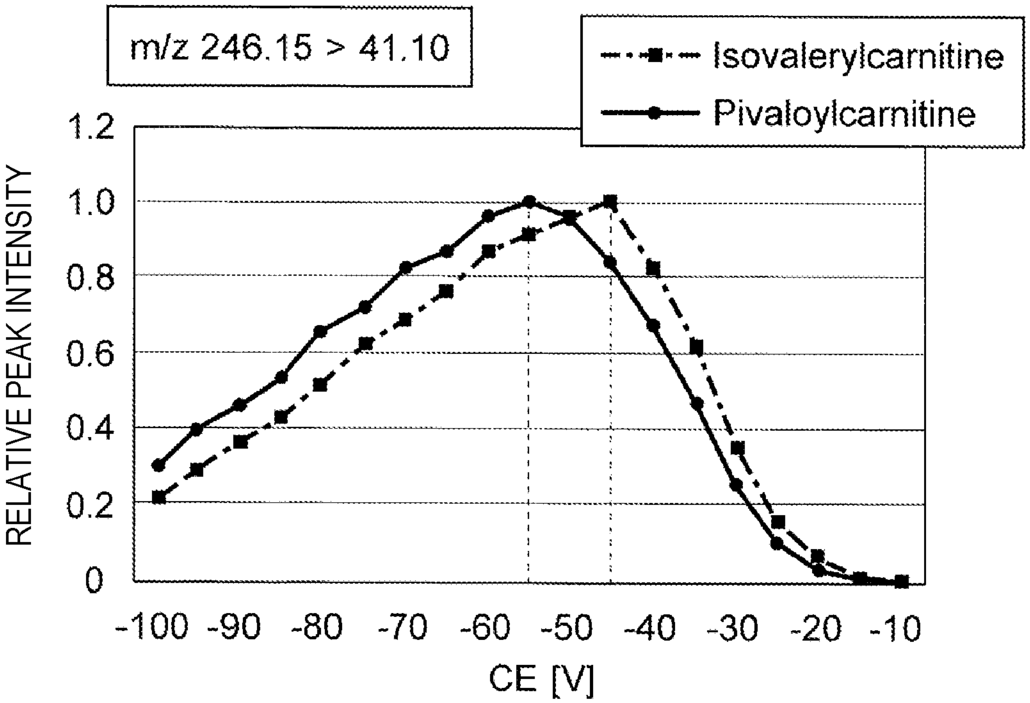
FIG. 5 is a graph illustrating a relationship between collision energy and peak intensity for i-C5 and p-C5 in an MRM transition: m/z 246.15>41.10.

As can be seen from FIG. 5, at CE=−45 V, the peak intensity of i-C5 is larger than that of p-C5. Therefore, when the C5 acylcarnitine is i-C5 (not including p-C5), the value of the confirmation ion ratio becomes large, and when the C5 acylcarnitine is p-C5 or includes p-C5, the value of the confirmation ion ratio becomes relatively small.

Therefore, a determination range that can be regarded as i-C5 with respect to the confirmation ion ratio is previously determined, and the component determination unit 33 is configured to determine whether or not the confirmation ion ratio calculated based on the actual measurement result is within the determination range. When the value of the confirmation ion ratio is within the determination range, it is determined that the C5 acylcarnitine contained in the unknown sample is i-C5. Meanwhile, when the value of the confirmation ion ratio is out of the determination range, it is determined that the C5 acylcarnitine contained in the sample includes p-C5. That is, although it is determined to be positive by the detection of C5 acylcarnitine, it is determined that there is a possibility of a false positive. The central control unit 5 is configured to display the determination result on the screen of the display unit 7 after receiving the determination result from the component determination unit 33.

As described above, although it is determined that the C5 acylcarnitine contained in the sample includes p-C5, it cannot be determined that i-C5 is not included, and therefore reexamination is necessary. However, the doctor who confirmed this result can determine that the detected C5 acylcarnitine is highly likely to be derived from an antibiotic agent, for example, from the medication history of the subject (newborn infant). Therefore, in a case where a positive result is obtained in the screening test, the doctor can give a parent of a newborn infant advice that there is a high possibility that the positive result is caused by not a congenital factor but an antibiotic agent.

The experiments by the inventor of the present invention can select the range of 1.4 to 2.6% as the determination range of the value of the confirmation ion ratio under the type of the apparatus and the analysis conditions described above. In this case, the center value is set to 2%, and the allowable width is set to ±30%. In this case, it can be determined that there is a possibility that the C5 acylcarnitine contained in the unknown sample is i-C5 when the value of the confirmation ion ratio based on the actual measurement data is within the range of 1.4 to 2.6%, and the C5 acylcarnitine contained in the unknown sample is p-C5 when the value of the confirmation ion ratio is outside the range of 1.4 to 2.6%. Of course, this determination range depends on the type of apparatus, analysis conditions, and the like. Therefore, it is necessary to previously determine an appropriate determination range by experiment or the like.

Figure 7:
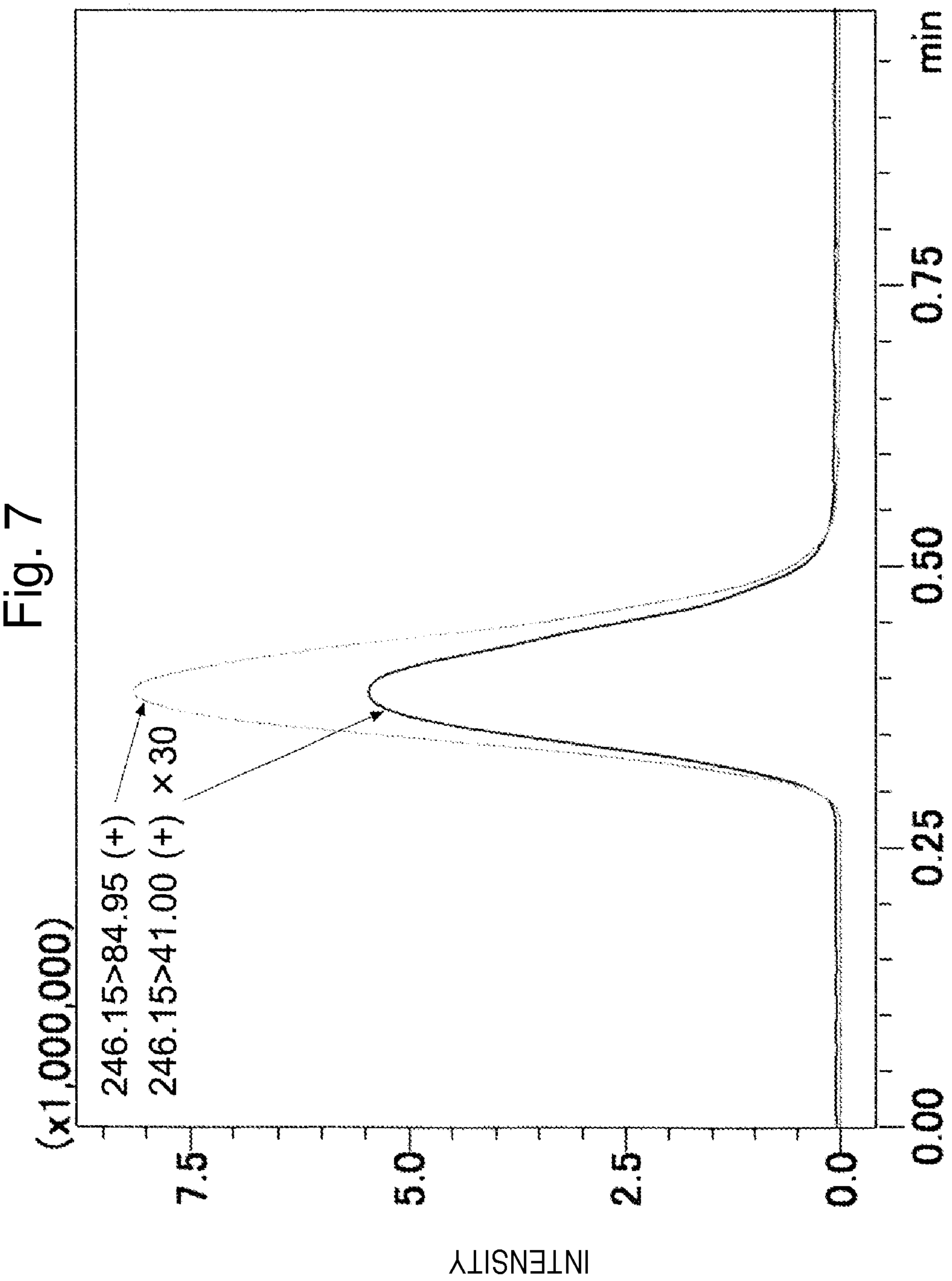
FIG. 7 is a diagram illustrating an actual measurement example of a chromatogram waveform when it is determined that a sample does not contain p-C5.
Figure 8:
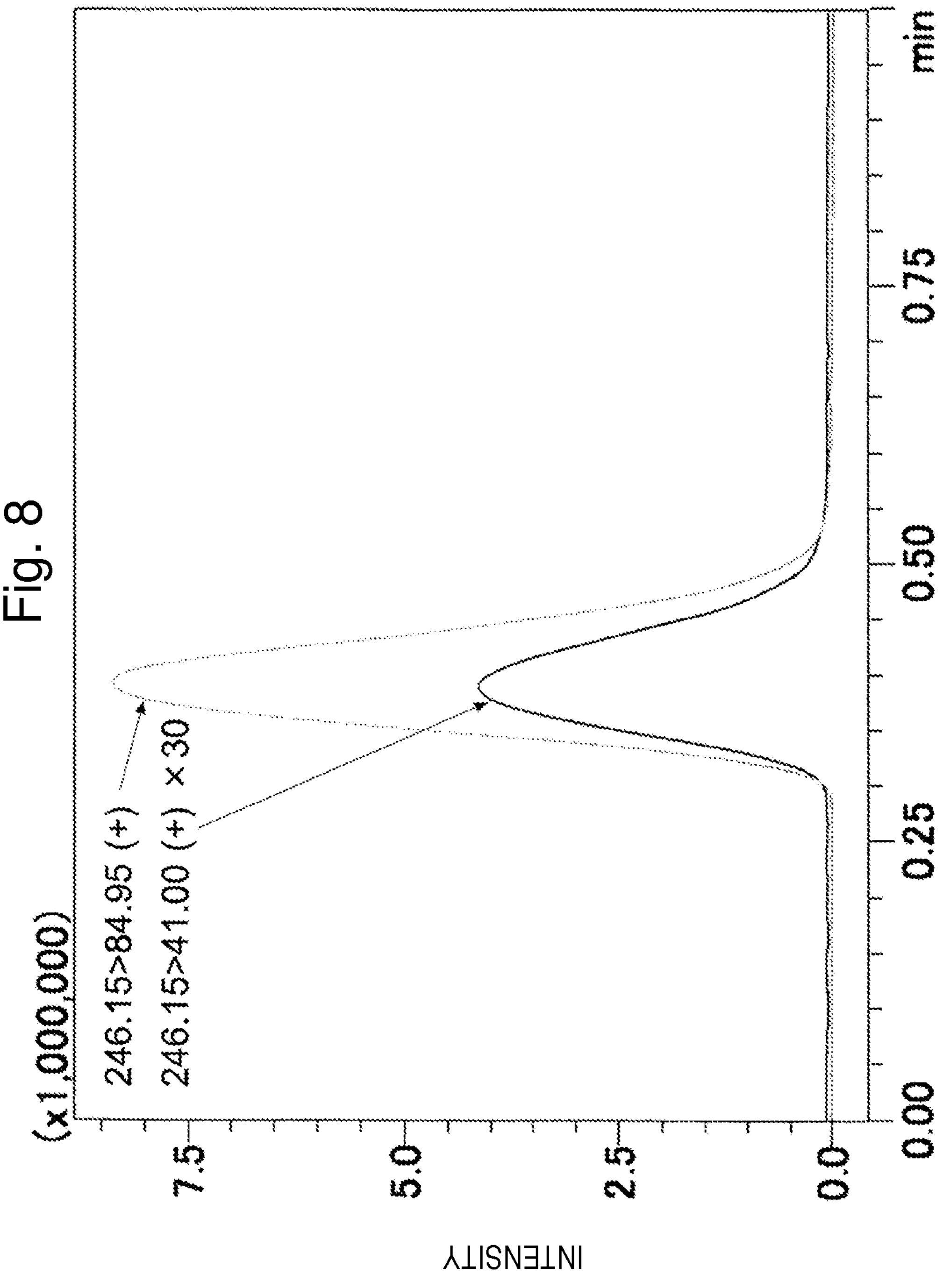
FIG. 8 is a diagram illustrating an actual measurement example of a chromatogram waveform when it is determined that a sample may contain p-C5.

FIGS. 7 and 8 are chromatogram waveform diagrams illustrating the results of an experiment on whether i-C5 and p-C5 are correctly determined, FIG. 7 being a chromatogram waveform diagram for a sample containing i-C5, FIG. 8 being a chromatogram waveform diagram for a sample containing p-C5. In each case, the component concentration is 100 μg/L. Since the intensity of the peak of m/z 246.15>41.00 is smaller than that of the peak of m/z 246.15>84.95 and is difficult to see, in FIGS. 7 and 8, the vertical axis (intensity axis) of the chromatogram of m/z 246.15>41.00 is enlarged by 30 times.

In the example illustrated in FIG. 7, since the value of the confirmation ion ratio falls within the determination range of 1.4 to 2.6%, it is determined that the value is of i-C5. In the example illustrated in FIG. 8, since the value of the confirmation ion ratio is out of the determination range of 1.4 to 2.6%, it is determined that the value may be of p-C5. As described above, it is experimentally confirmed that i-C5 and p-C5 can be accurately distinguished by using the ratio of the signal intensities in the two types of MRM transitions, that is, the confirmation ion ratio.

Another Example of Method for Distinguishing Between i-C5 and p-C5

As is found from FIG. 5, the peak intensity pattern for the change in collision energy is clearly different between i-C5 and p-C5. The collision energy value itself indicating the maximum peak intensity is different. Therefore, using this phenomenon can also distinguish between i-C5 and p-C5.

Specifically, under the control of the analysis control unit 4, the measurement unit 2 is configured to acquire ionic intensity data for an unknown sample while changing collision energy by a predetermined step width in are MRM transition of m/z 246.15>41.10. In the data processor 3, the peak intensity calculator 32 creates a peak intensity pattern as illustrated in FIG. 5 based on the obtained data. The component determination unit 33 is configured to determine whether the peak intensity pattern may be of only i-C5 or p-C5 by comparing the peak intensity pattern with the peak intensity patterns obtained previously for i-C5 and p-C5.

Alternatively, in the data processor 3, the peak intensity calculator 32 obtains a collision energy value at which the ionic intensity becomes peak (maximum) from the peak intensity pattern. The component determination unit 33 is configured to determine whether the obtained collision energy value corresponds to or is close to any collision energy value indicating the maximum peak intensity obtained previously for each of i-C5 and p-C5 to determine whether the collision energy value may be of only i-C5 or p-C5.

Figure 4:
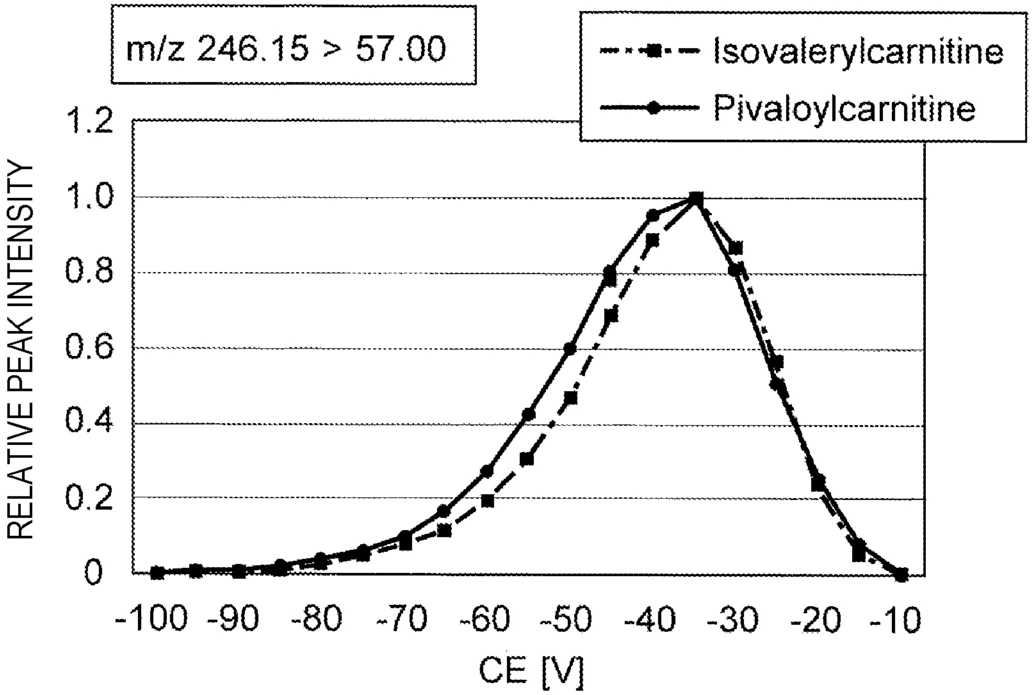
FIG. 4 is a graph illustrating a relationship between collision energy and peak intensity for i-C5 and p-C5 in an MRM transition: m/z 246.15>57.00.
Figure 6:
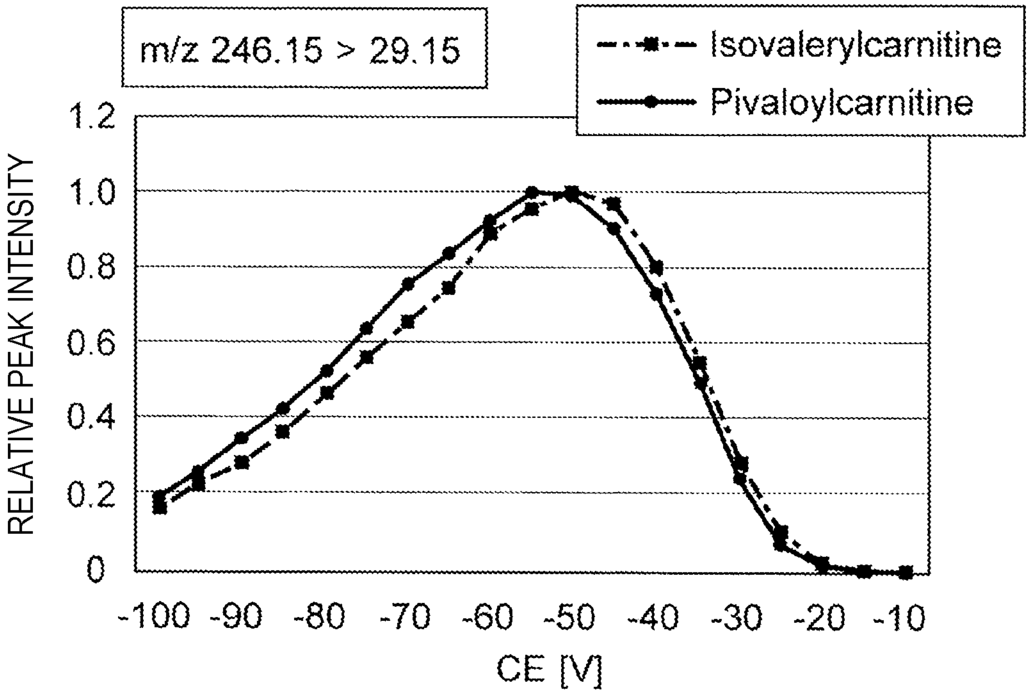
FIG. 6 is a graph illustrating a relationship between collision energy and peak intensity for i-C5 and p-C5 in an MRM transition: m/z 246.15>29.15.

In the description of the apparatus according to the above embodiment, the MRM transition: m/z 246.15>41.10 having the largest difference in the peak intensity pattern between i-C5 and p-C5 is used; however, as is found from FIGS. 4 and 6, in the other two types of MRM transitions (m/z 246.15>57.00, m/z 246.15>29.15), the peak intensity is sufficiently different between i-C5 and p-C5 depending on the value of collision energy. Therefore, when these MRM transitions (m/z 246.15>57.00, m/z 246.15>29.15) are used instead of m/z 246.15>41.10, i-C5 and p-C5 can also be distinguished.

Figure 2:
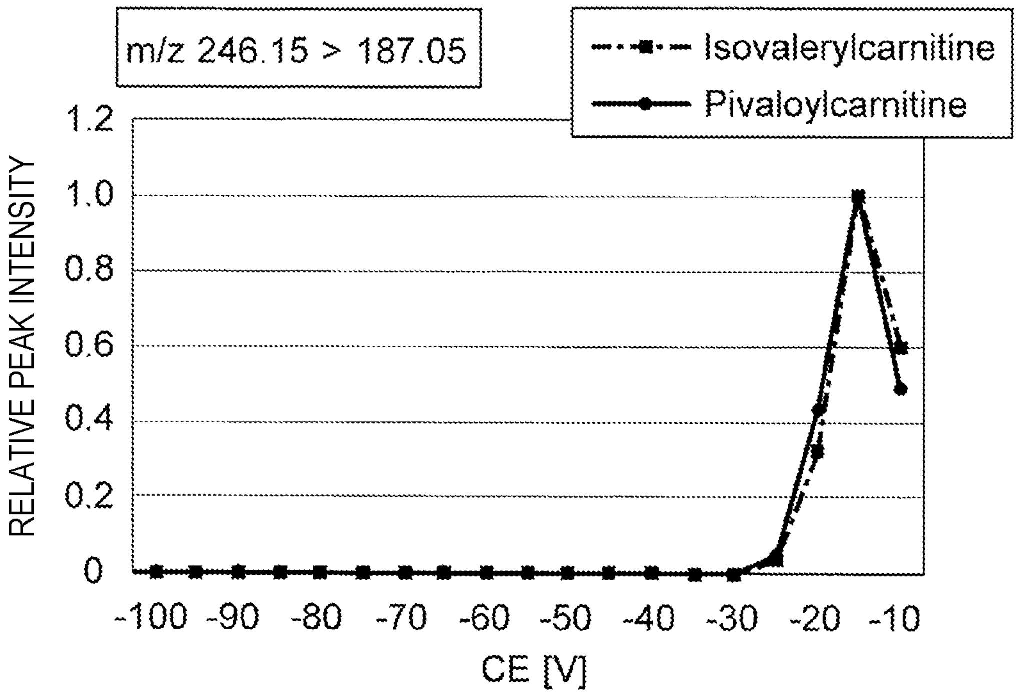
FIG. 2 is a graph illustrating a relationship between collision energy and peak intensity for isovalerylcarnitine (i-C5) and pivaloylcarnitine (p-C5) in an MRM transition: m/z 246.15>187.05.
Figure 9:
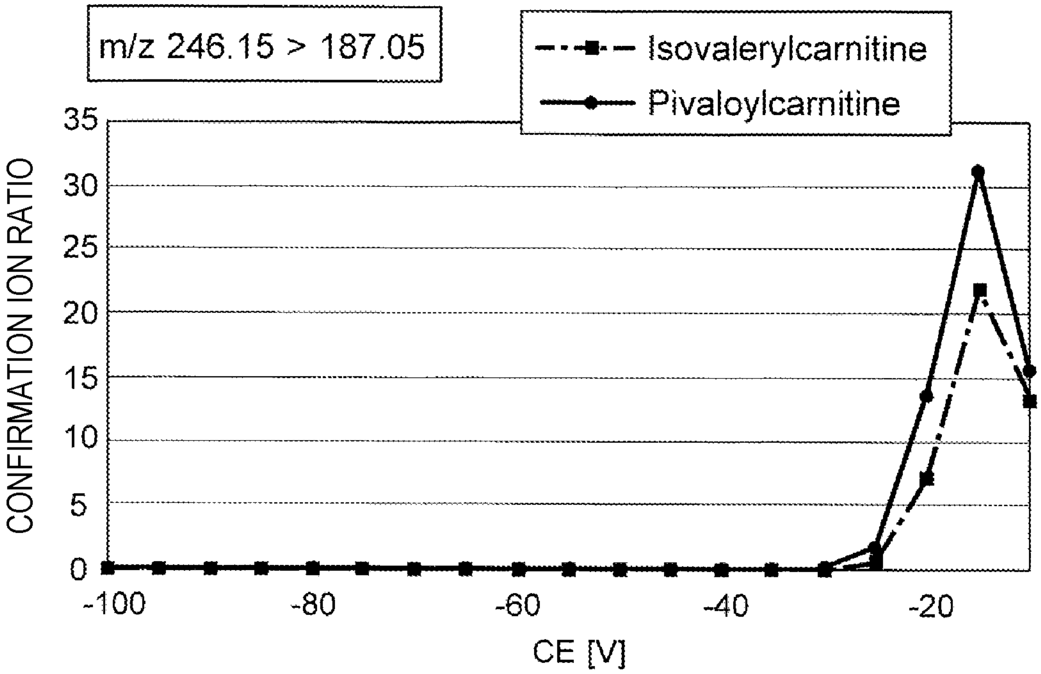
FIG. 9 is a graph illustrating the collision energy dependency of a confirmation ion ratio for i-C5 and p-C5 when an MRM transition: m/z 246.15>84.95 is set as a quantitative ion and an MRM transition: m/z 246.15>187.05 is set as a confirmation ion.

In the peak intensity pattern illustrated in FIG. 2, there is no clear difference between i-C5 and p-C5 in an MRM transition of m/z 246.15>187.05. In contrast, FIG. 9 plots the collision energy dependency of the confirmation ion ratio with the ions detected in an MRM transition of m/z 246.15>84.95 as the quantitative ions and the ions detected in an MRM transition of m/z 246.15>187.05 as the confirmation ions.

Figure 10A:
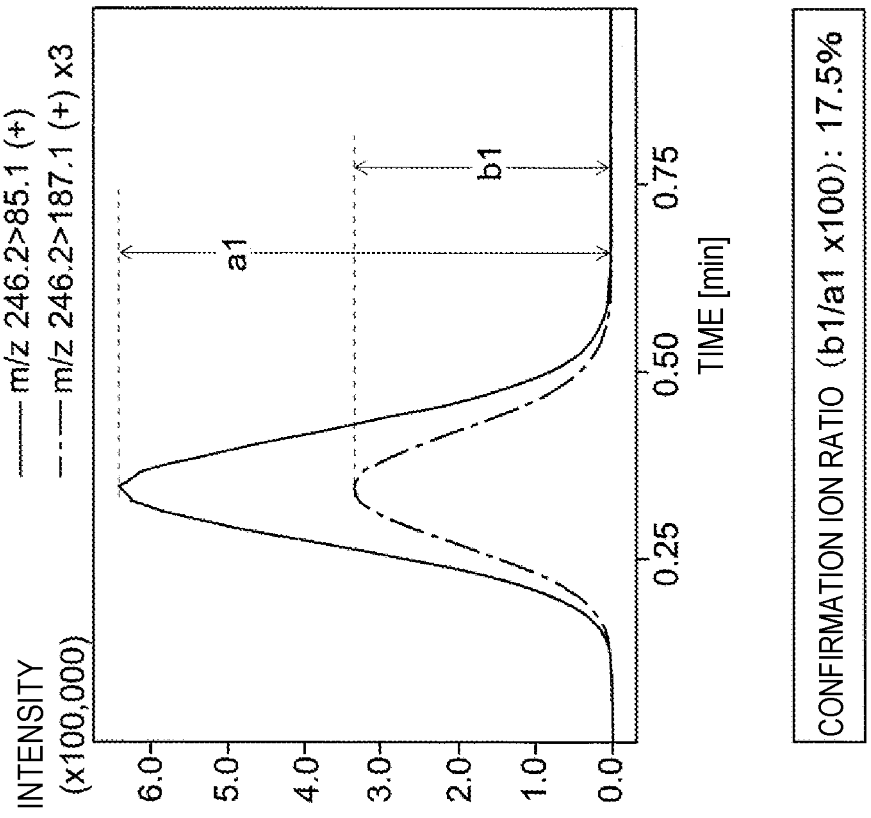
FIG. 10A and FIG. 10B are diagrams illustrating chromatogram waveforms obtained by actually measuring standard samples of i-C5 and p-C5 using MRM transitions: m/z 246.15>84.95 and m/z 246.15>187.05.
Figure 10B:
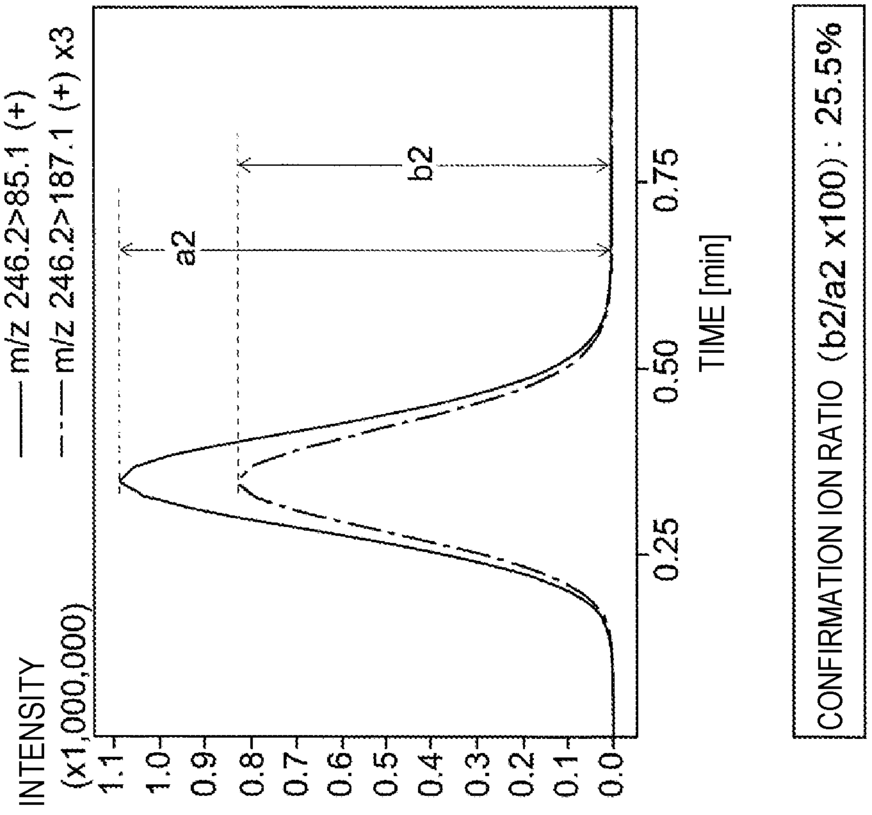

FIG. 10A and FIG. 10B are diagrams illustrating chromatogram waveforms obtained by actually measuring standard samples of i-C5 and p-C5 using MRM transitions: m/z 246.15>84.95 and m/z 246.15>187.05, respectively. In the chromatogram of i-C5 illustrated in FIG. 10A, the confirmation ion ratio ((b1/a1)×100) is 17.5%, whereas in the chromatogram of p-C5 illustrated in FIG. 10B, the confirmation ion ratio ((b2/a2)×100) is 25.5%, which are clearly different.

From these results, it is found that there is also a clear difference between i-C5 and p-C5 in the confirmation ion ratio in which m/z 246.15>187.05 is used as confirmation ions. That is, in addition to the three types of MRM transitions described above, an MRM transition of m/z 246.15>187.05 can also be used to distinguish between i-C5 and p-C5.

Figure 11A:
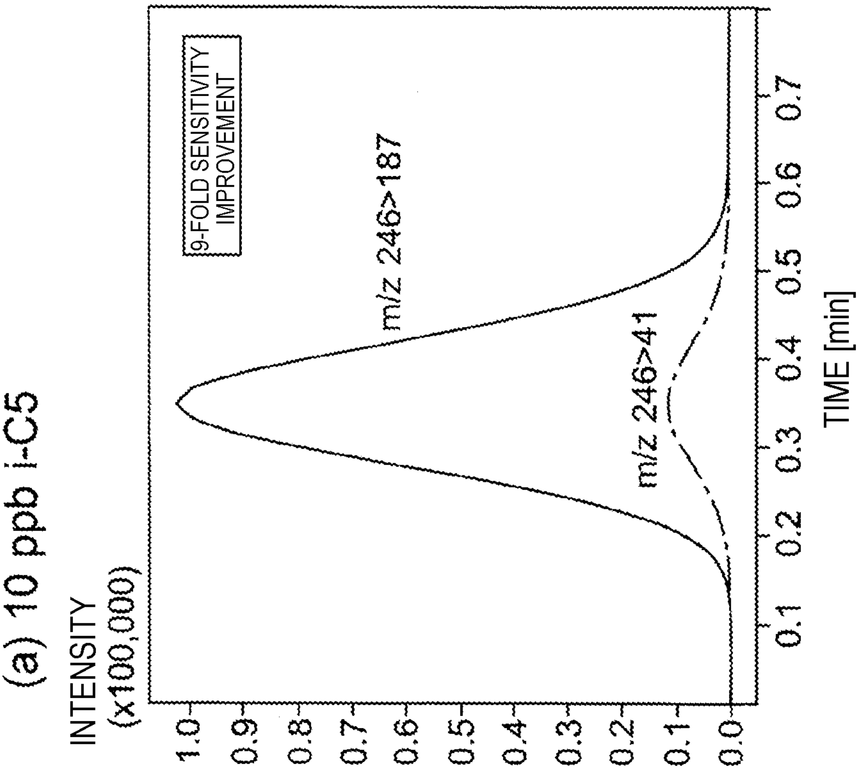
FIG. 11A and FIG. 11B are diagrams illustrating comparison of chromatogram waveforms with respect to standard samples of i-C5 and p-C5 in the case of using MRM transitions: m/z 246.15>84.95 and m/z 246.15>187.05.
Figure 11B:
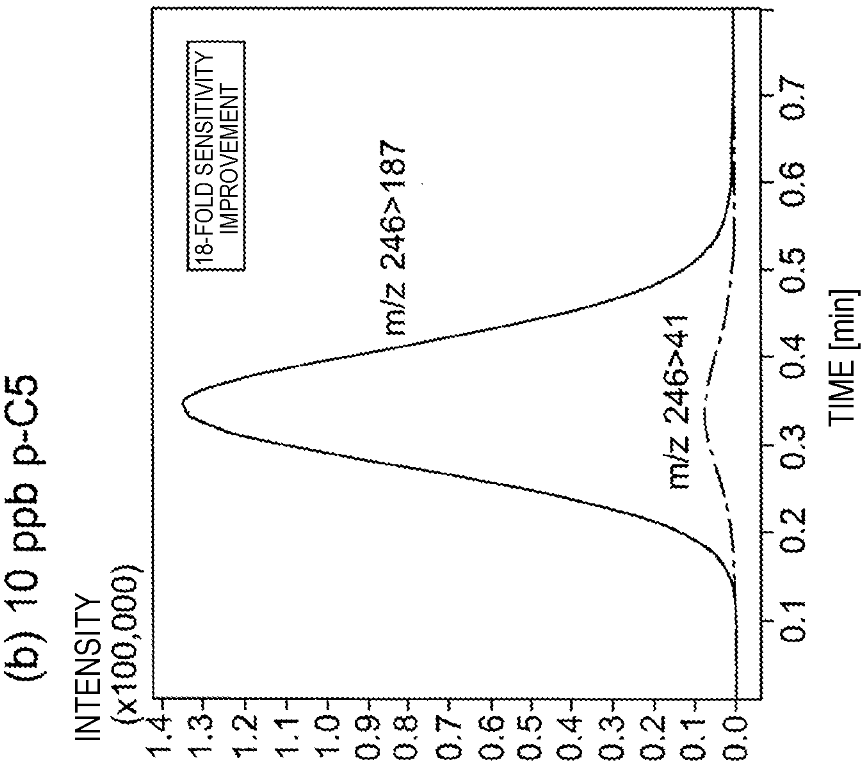

FIG. 11A and FIG. 11B are diagrams illustrating comparisons of chromatogram waveforms for standard samples of i-C5 and p-C5 in the case of using an MRM transition of m/z 246.15>187.05 and an MRM transition of m/z 246.15>41.10. The collision energy is set to a value with the highest sensitivity in each MRM transition.

From this actual measurement result, it is found that an MRM transition of m/z 246.15>187.05 has about 9 times higher detection sensitivity for i-C5 and about 18 times higher detection sensitivity for p-C5 than an MRM transition of m/z 246.15>41.10. That is, by using an MRM transition of m/z 246.15>187.05, it is possible to distinguish between i-C5 and p-C5 with higher sensitivity than other MRM transitions.

Figure 12:
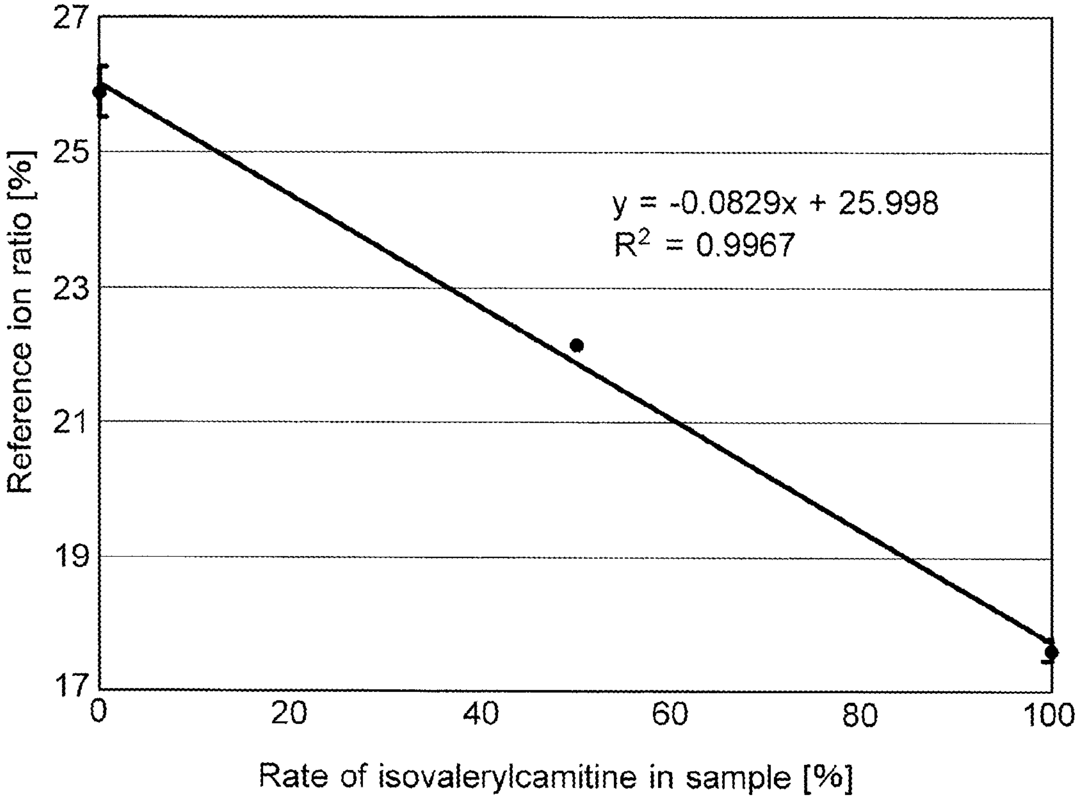
FIG. 12 is a diagram illustrating the relationship between the proportion of i-C5 the sample and the confirmation ion ratio in the case of using MRM transition: m/z 246.15>187.05.
Figure 13:
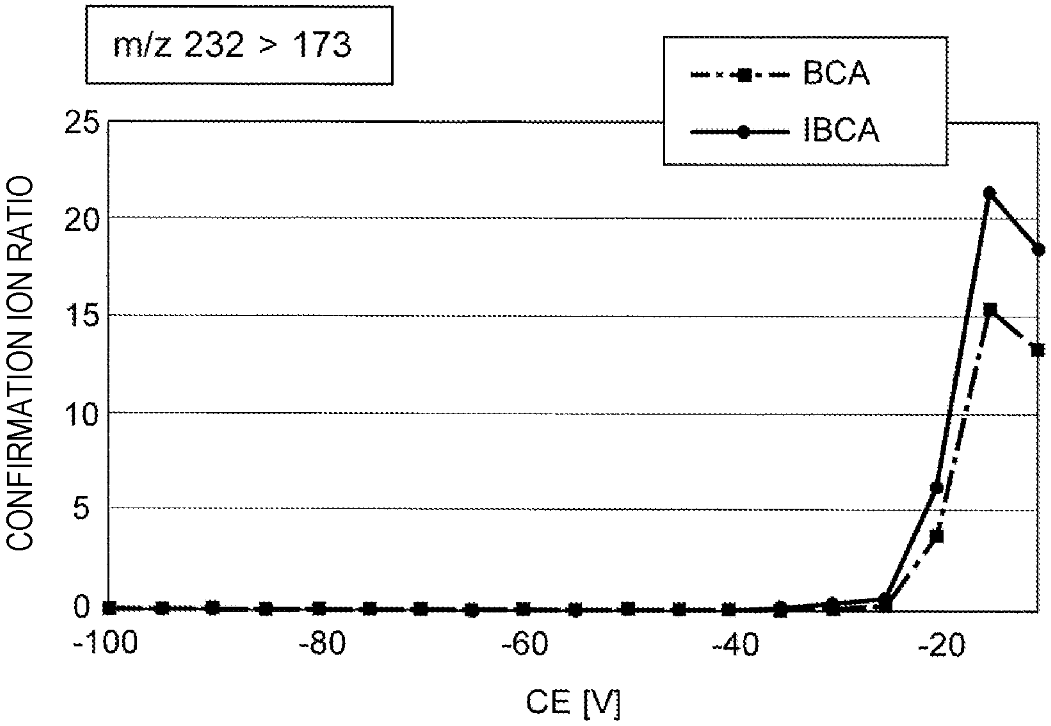
FIG. 13 is a graph illustrating the collision energy dependency of confirmation ion ratios of butyrylcarnitine (BCA) and isobutyrylcarnitine when MRM transition: m/z 232>85 is set as a quantitative ion and MRM transition: m/z 232>173 is set as a confirmation ion.
Figure 14:
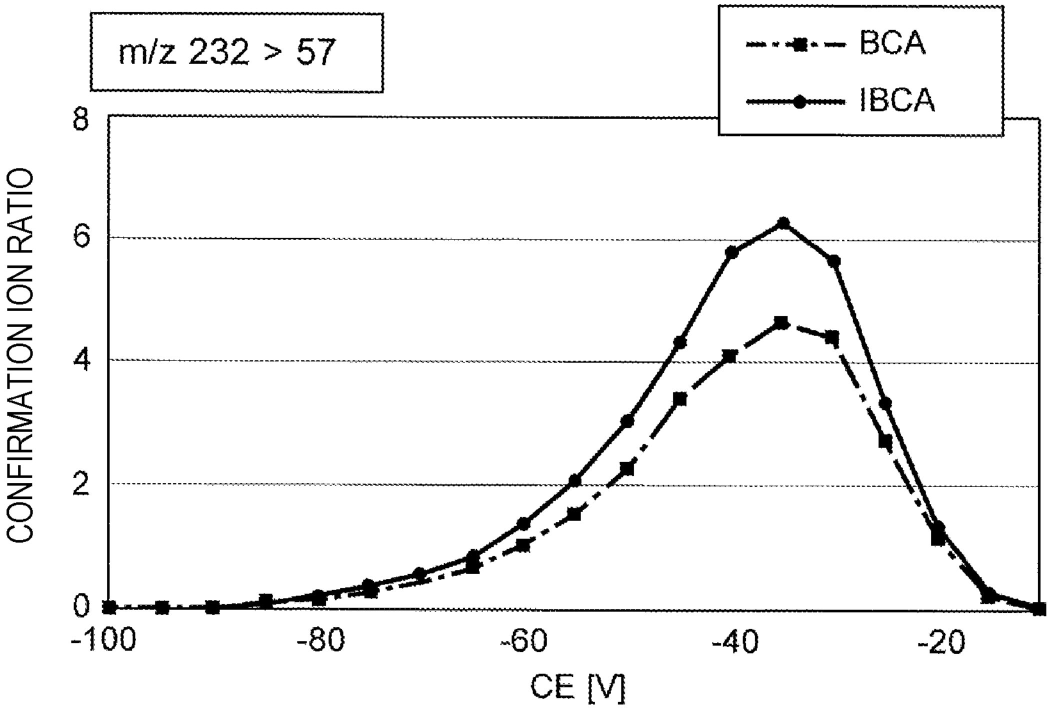
FIG. 14 is a graph illustrating the collision energy dependency of confirmation ion ratios of butyrylcarnitine (BCA) and isobutyrylcarnitine when MRM transition: m/z 232>85 is set as a quantitative ion and MRM transition: m/z 232>57 is set as a confirmation ion.
Figure 15:
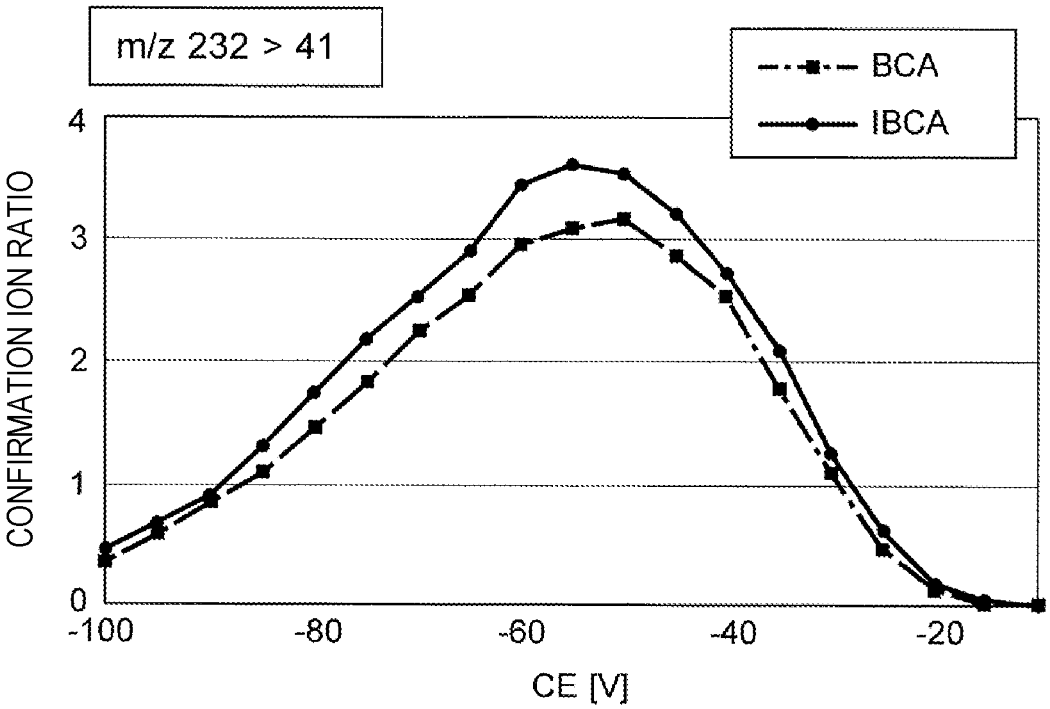
FIG. 15 is a graph illustrating the collision energy dependency of confirmation ion ratios of butyrylcarnitine (BCA) and isobutyrylcarnitine (IBCA) when MRM transition: m/z 232>85 is set as a quantitative ion and MRM transition: m/z 232>41 is set as a confirmation ion.
Figure 16:
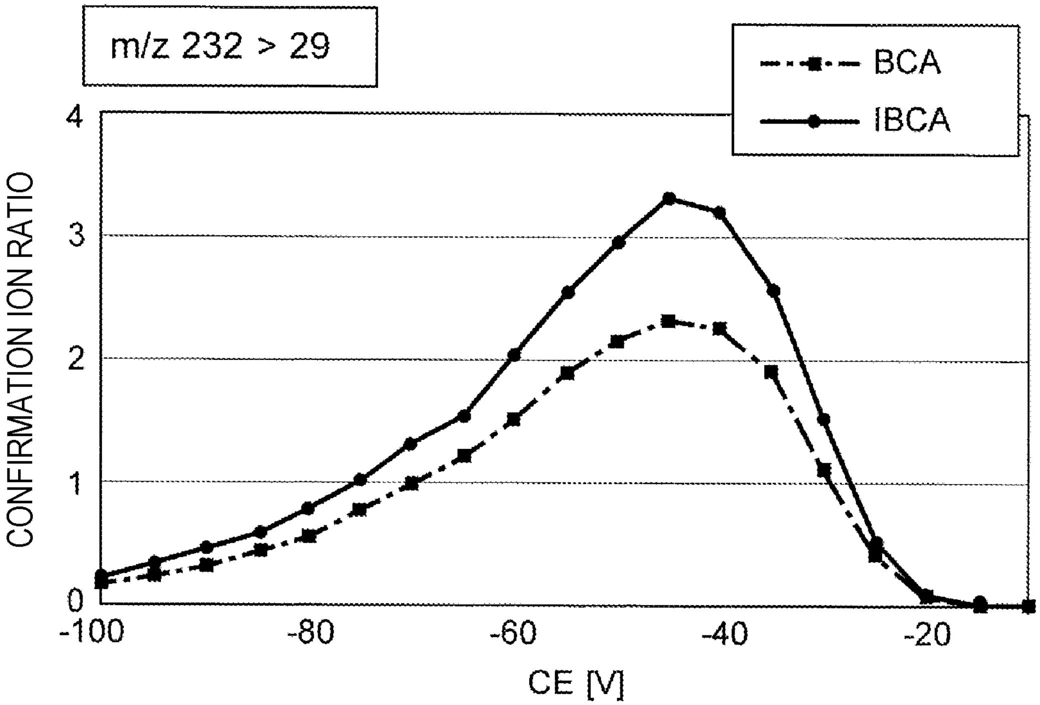
FIG. 16 is a graph illustrating the collision energy dependency of confirmation ion ratios for BCA and IBCA when an MRM transition: m/z 232>85 is set as a quantitative ion and an MRM transition: m/z 232>29 is set as a confirmation ion.

FIG. 12 is a diagram illustrating the relationship between the proportion of i-C5 in the sample and the confirmation ion ratio obtained from the actual measurement result, in the case of using an MRM transition of m/z 246.15>187.05. As illustrated in FIG. 12, the proportion of i-C5 in the sample and the confirmation ion ratio have a relationship represented by a linear expression, that is, a straight line. Therefore, in the apparatus of the above embodiment, the above relationship experimentally obtained previously is stored in the component determination unit 33 as a calibration curve, and the proportion of i-C5 or p-C5 can be estimated from the confirmation ion ratio obtained from the actual measurement for the sample using the calibration curve. The estimation of the proportion of i-C5 or p-C5 using the confirmation ion ratio can be performed by using MRM transitions other than m/z 246.15>187.05.

However, when the detection sensitivity of i-C5 or p-C5 is low, it is difficult to ensure sufficient accuracy. In contrast, as described above, since an MRM transition of m/z 246.15>187.05 has higher detection sensitivity than other MRM transitions, the estimation accuracy of the proportion of i-C5 or p-C5 can be increased.

In the above description, the i-C5 and the p-C5 are distinguished based on the measurement result of only one type of MRM transition; however, it is also possible to improve the reliability of determination by combining information on the ionic intensity obtained in a plurality of types of MRM transitions.

The distinction between isovalerylcarnitine and pivaloylcarnitine, which is an isomer of isovalerylcarnitine, has been described, and it is also possible to distinguish other acylcarnitines by a similar method. Some examples of this method will be described.

Distinction Between BCA and IBCA

C4 acylcarnitine (acylcarnitine having an acyl group having 4 carbon atoms) includes isomers of isobutyrylcarnitine (hereinafter, sometimes abbreviated as "IBCA") in addition to butyrylcarnitine (hereinafter, sometimes abbreviated as "BCA"). Butyrylcarnitine is known as a metabolite associated with congenital diseases such as short chain acyl-CoA dehydrogenase deficiency and glutaric acidemia type II; however, it is difficult to distinguish butyrylcarnitine because it has the same mass as isobutyrylcarnitine, which is an isomer of butyrylcarnitine, and there is no specificity of product ions generated by dissociation.

FIGS. 13 to 16 are graphs illustrating actual measurement results of the collision energy dependency of the confirmation ion ratio when the product ions according to an MRM transition of m/z 232>85 having the highest sensitivity for BCA and IBCA are used as the quantitative ions, and the product ions in the other four main types of MRM transitions (m/z 232>173, m/z 232>57, m/z 232>41, m/z 232>29) are used as the confirmation ions.

This result indicates that there is a sufficient difference in the confirmation ion ratio between BCA and IBCA at a specific collision energy in any of the four types of MRM transitions of m/z 232>173, m/z 232>57, m/z 232>41, and m/z 232>29. From this, it is possible to distinguish between BCA and IBCA by using the confirmation ion ratio similarly to the distinction between i-C5 and p-C5. In addition, considering the magnitude of the peak intensity observed in the chromatogram, that is, the detection sensitivity and the magnitude of the difference in the confirmation ion ratio between BCA and IBCA, it can be said that m/z 232>173 is preferable as the confirmation ion among the above four types of MRM transitions.

Distinction Between C5-DC and C6-OH

All of the above examples are examples in which acylcarnitines having exactly the same mass are distinguished from each other because the composition formulae of the compounds are the same, but in a case of acylcarnitines having different composition formulae, these acylcarnitines may not be distinguished by integer mass because the mass difference is significantly small.

For example, glutarylcarnitine (hereinafter sometimes abbreviated as "C5-DC") is known as a metabolite associated with congenital diseases such as glutaric acidemia type I, and has a precise molecular weight of 275.1368806. Meanwhile, hydroxyhexanoylcarnitine (hereinafter, sometimes abbreviated as "C6-OH") has a precise molecular weight of 275.173264, and can be distinguished from C5-DC by a precise mass after the decimal point, but cannot be distinguished by mass by a general triple quadrupole mass spectrometer used as the apparatus of the above embodiment. For both C5-DC and C6-OH, the MRM transition with the best sensitivity is m/z 276>85, and it is also difficult to distinguish between C5-DC and C6-OH by the ion peak intensity in this MRM transition.

For each of C5-DC and C6-OH, when the product ion scan measurement was performed while changing the collision energy with the precursor ion at m/z 276, it was found that specific product ions were able to be observed at each specific collision energy. Specifically, when the collision energy is around −30 V, product ions in the MRM transition of m/z 276>87 in C5-DC and product ions in the MRM transition of m/z 276>69 in C6-OH can be specifically detected.

Figure 17:
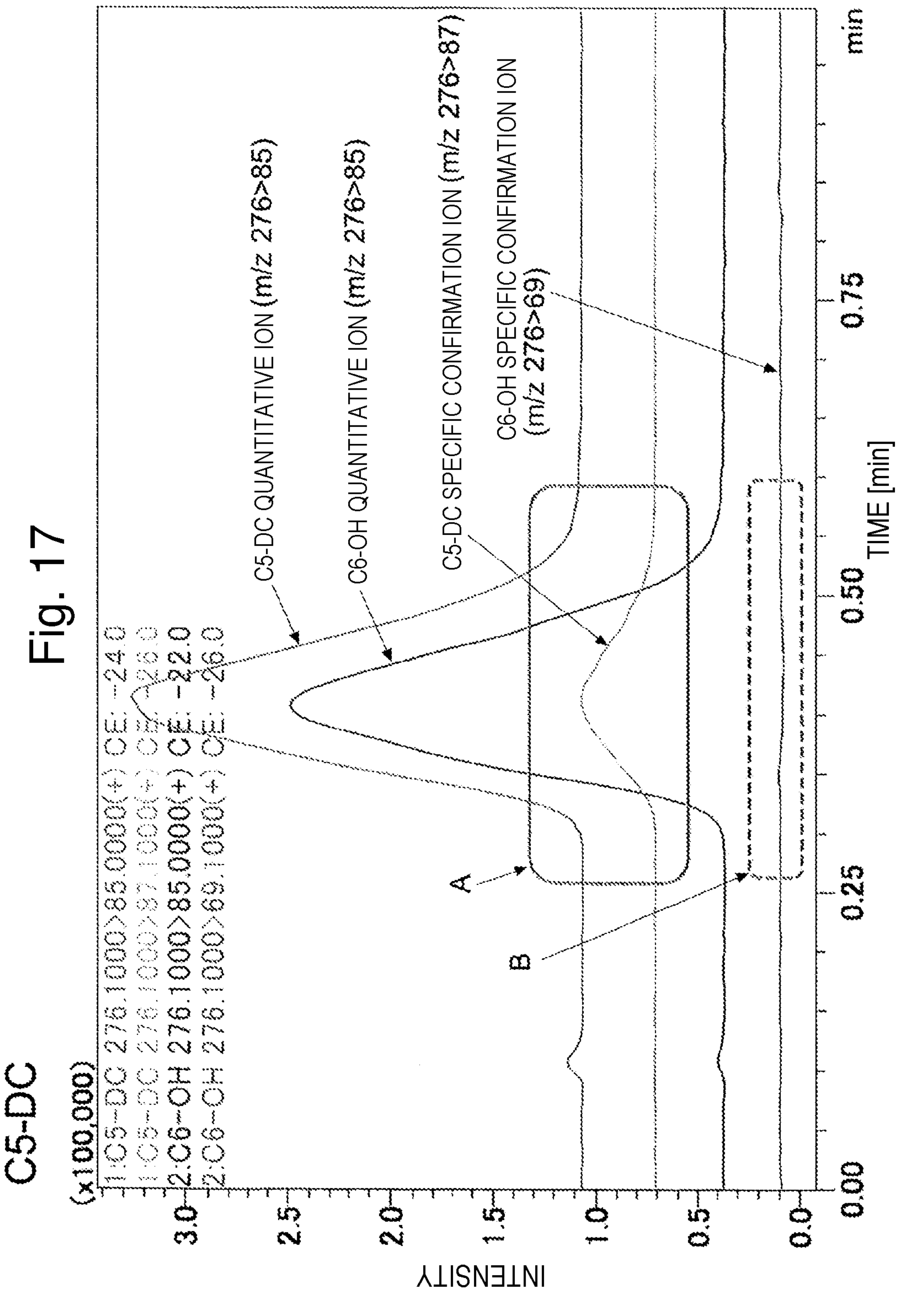
FIG. 17 is a diagram illustrating actually measured chromatogram waveforms in MRM transitions of m/z 276>87 and m/z 276>69 for a sample containing glutarylcarnitine (C5-DC).
Figure 18:
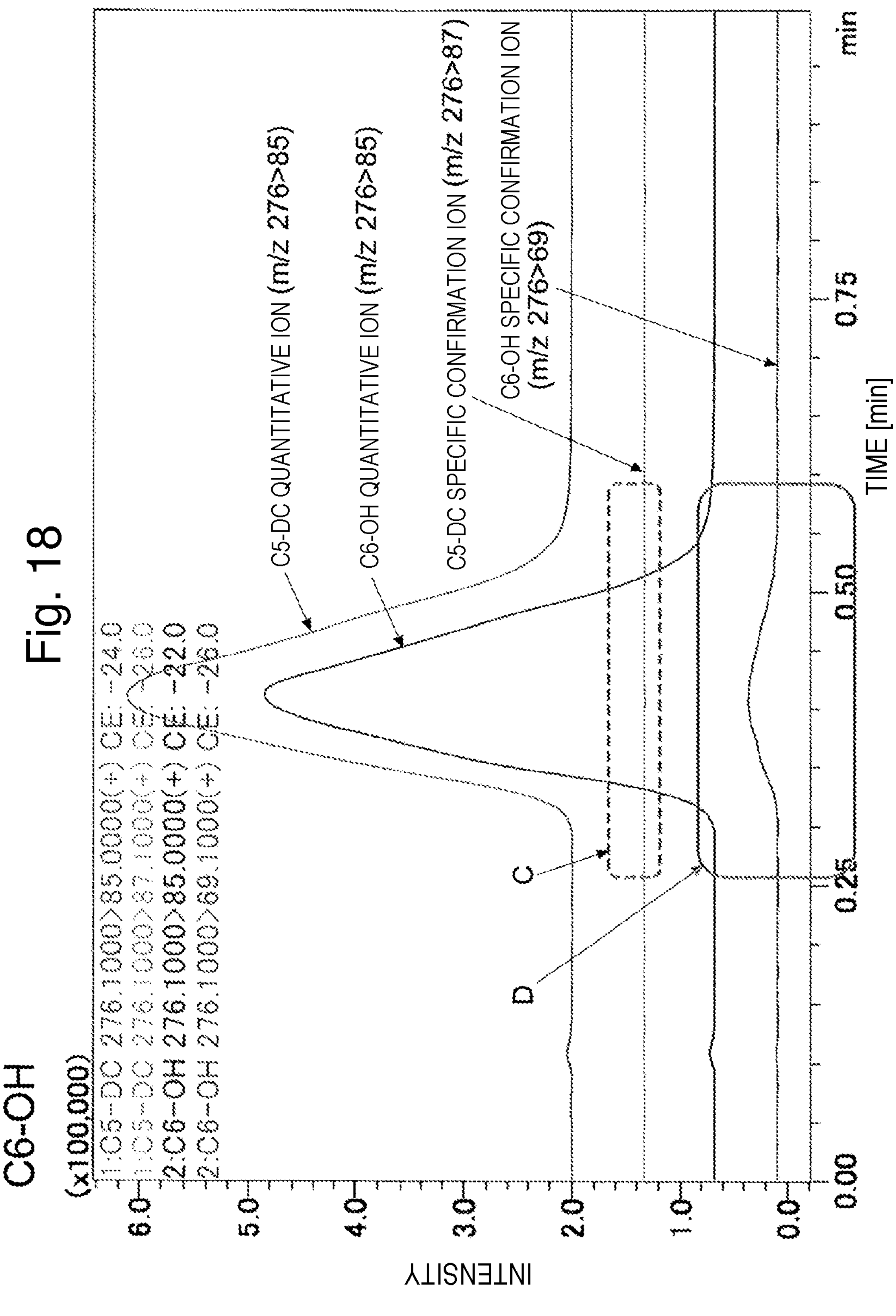
FIG. 18 is a diagram illustrating actually measured chromatogram waveforms in MRM transitions of m/z 276>87 and m/z 276>69 for a sample containing hydroxyhexanoylcarnitine (C6-OH).
Figure 19:
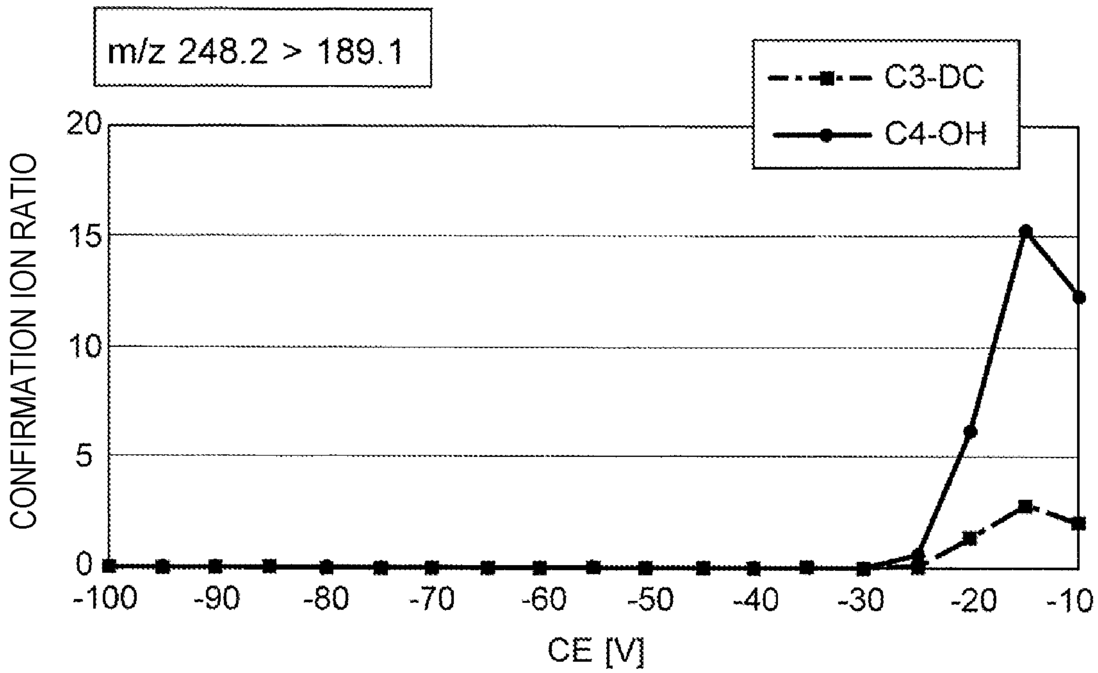
FIG. 19 is a graph illustrating the collision energy dependency of confirmation ion ratios for malonylcarnitine (C3-DC) and 3-hydroxybutyrylcarnitine (C4-OH) when MRM transition: m/z 248.2>85.1 is se as a quantitative ion and MRM transition: m/z 248.2>189.1 is set as a confirmation ion.
Figure 20:
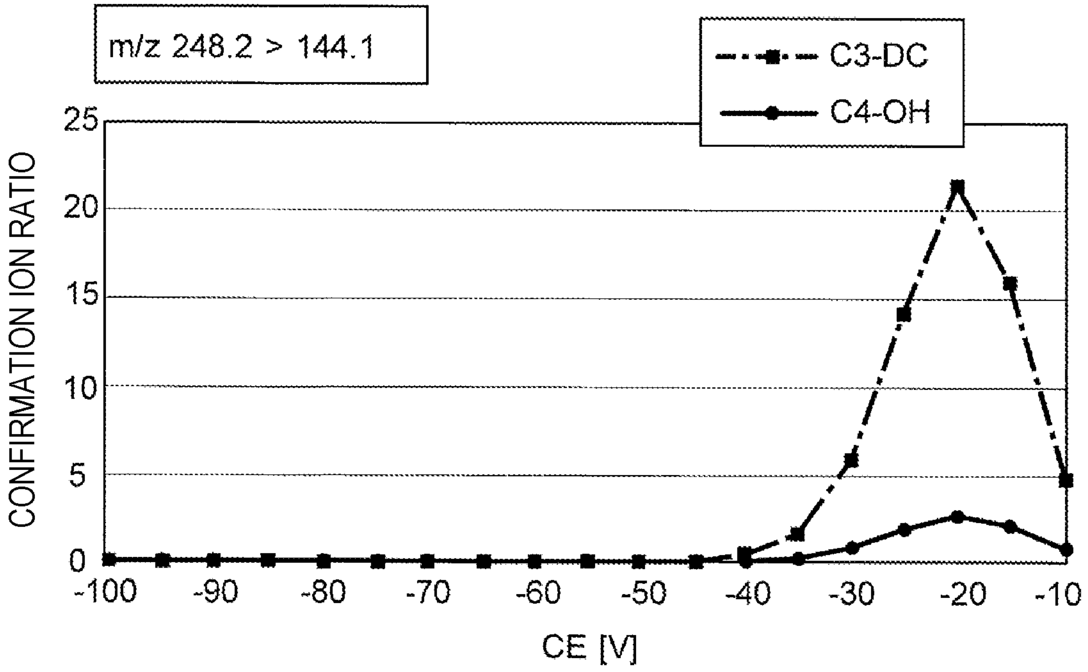
FIG. 20 is a graph illustrating the collision energy dependency of the confirmation ion ratios for C3-DC and C4-OH when MRM transition: m/z 248.2>85.1 is set as a quantitative ion and MRM transition: m/z 248.2>144.1 is set as a confirmation ion.
Figure 21:
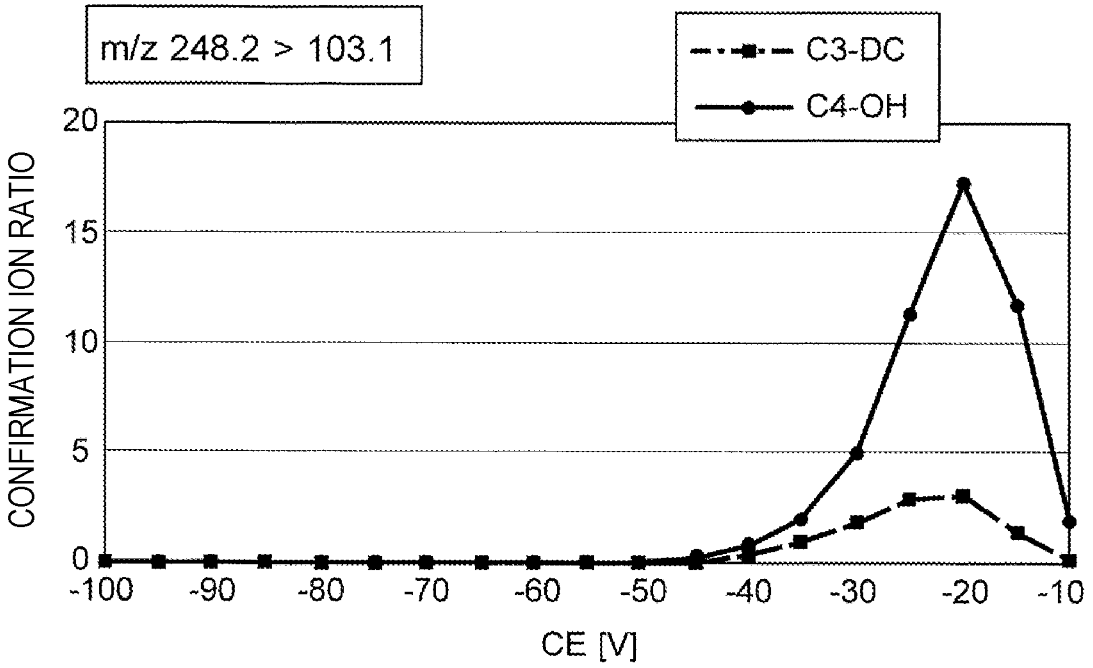
FIG. 21 is a graph illustrating the collision energy dependency of the confirmation ion ratios for C3-DC and C4-OH when MRM transition: m/z 248.2>85.1 is set as a quantitative ion and MRM transition: m/z 248.2>103.1 is set as a confirmation ion.
Figure 22:
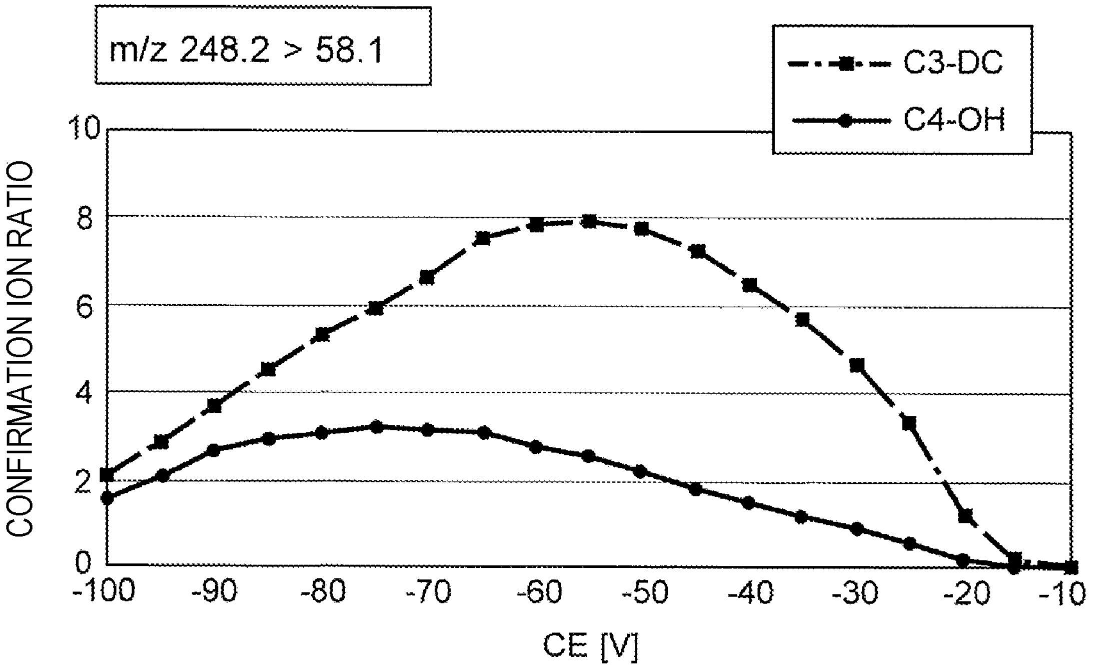
FIG. 22 is a graph illustrating the collision energy dependency of the confirmation ion ratios for C3-DC and C4-OH when MRM transition: m/z 248.2>85.1 is set as a quantitative ion and MRM transition: m/z 248.2>58.1 is set as a confirmation ion.
Figure 23:
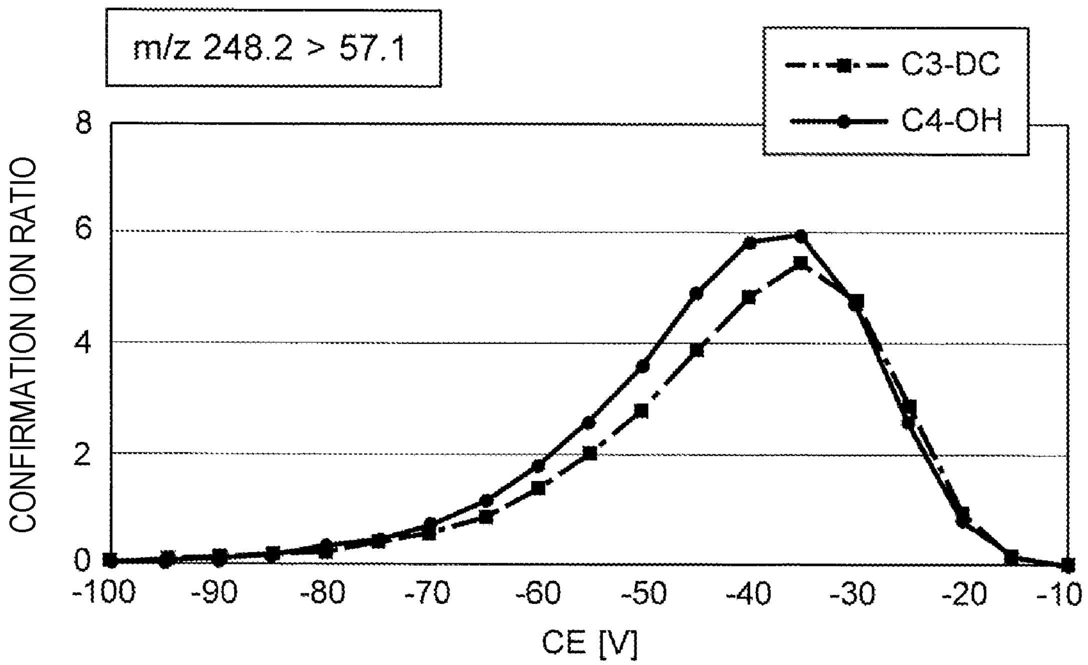
FIG. 23 is a graph illustrating the collision energy dependency of the confirmation ion ratios for C3-DC and C4-OH when MRM transition: m/z 248.2>85.1 is set as a quantitative ion and MRM transition: m/z 248.2>57.1 is set as a confirmation ion.
Figure 24:
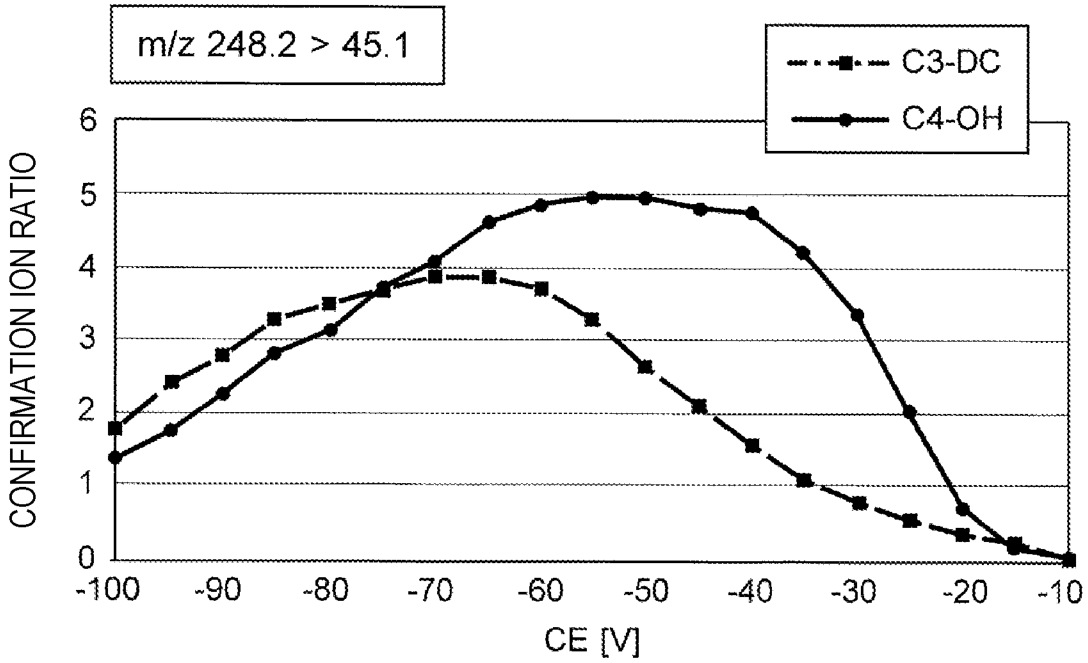
FIG. 24 is a graph illustrating the collision energy dependency of the confirmation ion ratios for C3-DC and C4-OH when MRM transition: m/z 248.2>85.1 is set as a quantitative ion and MRM transition: m/z 248.2>45.1 is set as a confirmation ion.
Figure 25:
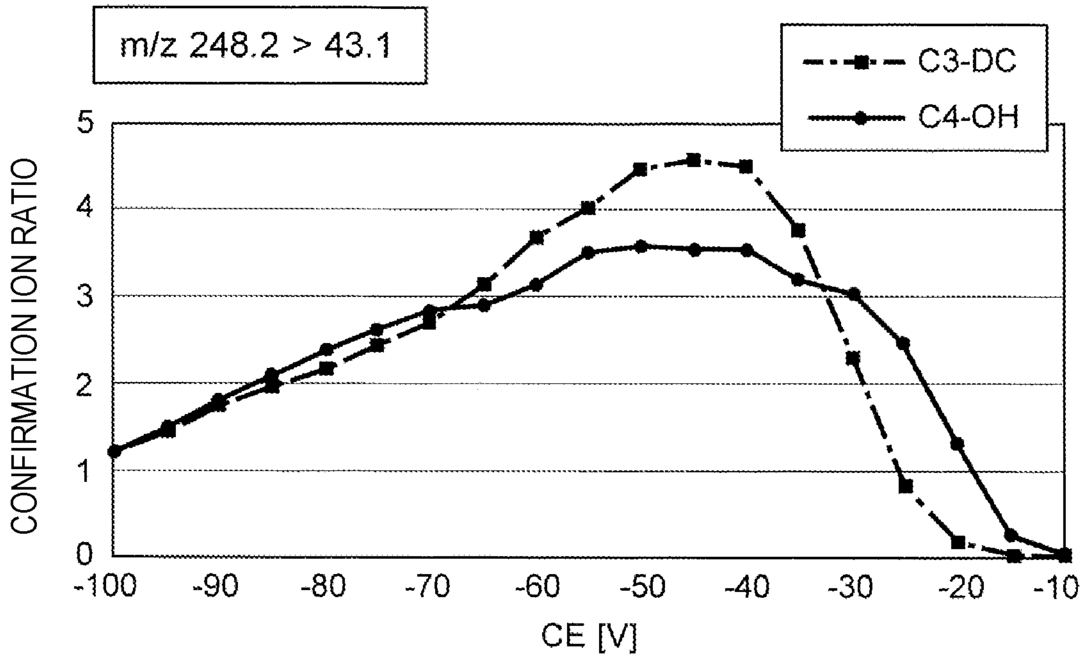
FIG. 25 is a graph illustrating the collision energy dependency of the confirmation ion ratios for C3-DC and C4-OH when MRM transition: m/z 248.2>85.1 is set as a quantitative ion and MRM transition: m/z 248.2>43.1 is set as a confirmation ion.
Figure 26:
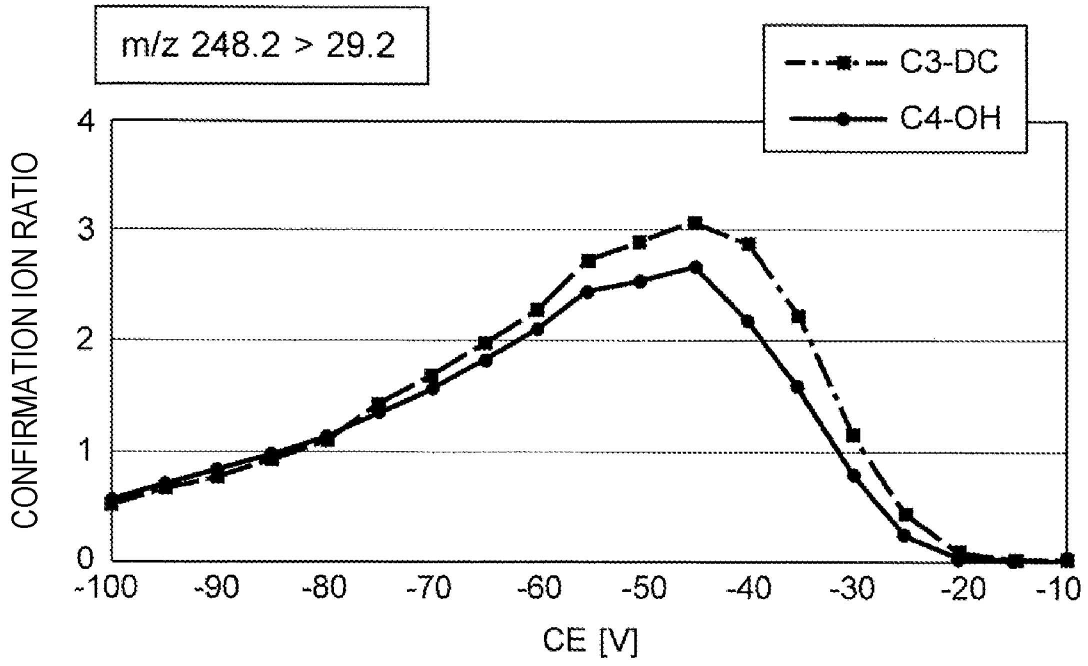
FIG. 26 is a graph illustrating the collision energy dependency of the confirmation ion ratios for C3-DC and C4-OH when MRM transition: m/z 248.2>85.1 is set as a quantitative ion and MRM transition: m/z 248.2>29.2 is set as a confirmation ion.

FIGS. 17 and 18 are diagrams illustrating actually measured chromatogram waveforms in two types of MRM transitions: m/z 276>87 and m/z 276>69 for a sample containing C5-DC and C6-OH, respectively. Each diagram also illustrates an actually measured chromatogram waveform in an MRM transition of m/z 276>85, which is conventionally used as quantitative ions for C5-DC and C6-OH.

As illustrated in A and B of FIG. 17, for C5-DC, a clear peak is observed in an MRM transition of m/z 276>87, but no peak is observed in an MRM transition of m/z 276>69. In contrast, as illustrated in C and D in FIG. 18, for C6-OH, a clear peak is observed in an MRM transition of m/z 276>69, whereas no peak is observed in an MRM transition of m/z 276>87. Therefore, based on the two MRM transitions, that is, the peak intensities of m/z 276>69 and m/z 276>87, it is possible to distinguish between C5-DC and C6-OH as the acylcarnitine contained in the sample.

As described above, C5-DC and C6-OH having the same integer mass can be distinguished by using the signal intensity of a specific confirmation ion, not a quantitative ion common to both.

Distinction Between C3-DC and C4-OH

As another example, malonylcarnitine (hereinafter sometimes abbreviated as "C3-DC") is known as a metabolite associated with congenital diseases such as malonic acidemia and has a precise molecular weight of 247.1055822. Meanwhile, 3-hydroxybutyrylcarnitine (hereinafter sometimes abbreviated as "C4-OH") is known as a metabolite associated with congenital diseases such as 3-hydroxyacyl-CoA dehydrogenase deficiency, and has a precise molecular weight of 247.1419656. C3-DC and C4-OH can be distinguished from each other by precise mass after the decimal point, but cannot be distinguished by integer mass as in the above example. The MRM transition with the best sensitivity is m/z 248>85, and distinction with the peak intensity of this MRM transition is also difficult.

As in the above example, the presence or absence of specific product ions between C3-DC and C4-OH was examined, but there were no specific product ions found between C5-DC and C6-OH. Therefore, the possibility of the distinction using the difference in the confirmation ion ratio in the specific collision energy described above was examined.

FIGS. 19 to 26 are graphs illustrating actual measurement results of collision energy dependency of confirmation ions when, for C3-DC and C4-OH, product ions in the MRM transition of m/z 248.2>85.1 with the highest sensitivity are used as quantitative ions, and product ions in the other eight main MRM transitions (m/z 248.2>189.1, m/z 248.2>144.1, m/z 248.2>103.1, m/z 248.2>58.1, m/z 248.2>57.1, m/z 248.2>45.1, m/z 248.2>43.1, m/z 248.1>29.2) are used as confirmation ions.

This result indicates that there is a sufficient difference in the confirmation ion ratio between C3-DC and C4-OH at a specific collision energy in any of the eight types of MRM transitions: m/z 248.2>189.1, m/z 248.2>144.1, m/z 248.2>103.1, m/z 248.2>58.1, m/z 248.2>57.1, m/z 248.2>45.1, m/z 248.2>43.1, and m/z 248.1>29.2. From this, similarly to the distinction between BCA and IBCA, it is possible to distinguish between C3-DC and C4-OH by using the confirmation ion ratio in a predetermined confirmation ion.

As described above, with the acylcarnitine analyzer of the present embodiment and modifications of the acylcarnitine analyzer of the present embodiment, it is possible to easily distinguish between acylcarnitines having exactly the same molecular weight such as i-C5 and p-C5, or BCA and IBCA, or between acylcarnitines having the same integer mass such as C5-DC and C6-OH, or C3-DC and C4-OH. The information available for the distinction is either the ratio between the signal intensity of the quantitative ions and the signal intensity of the confirmation ions under the specific collision energy, that is, the confirmation ion ratio, the pattern of change in peak intensity corresponding to the change in collision energy in the specific confirmation ions, or the signal intensity of the confirmation ion specifically observed for each acylcarnitine.

The acylcarnitine analyzer of the above embodiment can be modified as follows. That is, in the apparatus of the above embodiment, the column is not provided between the injector 13 and the ESI spray 21, and the sample introduction by the flow injection analysis method in which the sample liquid is supplied into the mobile phase fed by the liquid supply pump 12 and the sample liquid is introduced into the ESI spray 21 without performing component separation by the column is adopted, but the components in the sample may be separated by the liquid chromatograph and then introduced into the triple quadrupole mass spectrometer.

That is, in the apparatus illustrated in FIG. 1, a column may be provided between the injector 13 and the ESI spray 21, and a sample solution (eluate) containing each component separated by the column may be introduced into the ESI spray 21. In general, i-C5 and p-C5 can be separated by liquid chromatograph, but both retention times are close, and thus cannot be sufficiently separated in some cases. In such a case, acylcarnitines such as i-C5 and p-C5 can be accurately distinguished by using the MRM measurement result for a specific MRM transition as described above.

The analysis using such a liquid chromatograph mass spectrometer is often used in the reexamination, and the distinction accuracy in the reexamination can be enhanced by using the above method.

The previously described embodiment and its various modifications are mere examples of the present invention. Any change, modification, or addition appropriately made within the spirit of the present invention will evidently fall within the scope of the claims of the present application.

In the above description of the embodiment, the number of digits after the decimal point of the numerical value indicating the mass-to-charge ratio in the MRM transition may be one digit or two digits, but as already described, the accuracy of the mass-to-charge ratio value depends on the mass accuracy and the mass resolution of the apparatus. Therefore, for example, an MRM transition targeting ions included in a range of ±0.1, ±0.2, ±0.3, or ±0.4 relative to a mass-to-charge ratio value represented by one digit or two digits after the decimal point substantially corresponds to the MRM transition described in the claims of the present application.

Various Modes

It is evident for a person skilled in the art that the previously described illustrative embodiment is a specific example of the following modes of the present invention.

(Clause 1) One mode of a method for analyzing acylcarnitine according to the present invention is a method for analyzing C5 acylcarnitine using a tandem mass spectrometer, the method including:

a measurement step of performing multiple reaction monitoring (MRM) measurement on a specimen according to at least one of MRM transitions of m/z 246>187, m/z 246>57, m/z 246>41, and m/z 246>29; and a processing step of distinguishing between isovalerylcarnitine and pivaloylcarnitine which is an isomer of isovalerylcarnitine in the specimen or determining whether or not C5 acylcarnitine in the specimen includes pivaloylcarnitine, using a measurement result obtained in the measurement step.

(Clause 16) One mode of an acylcarnitine analyzer according to the present invention is an acylcarnitine analyzer capable of performing the method for analyzing acylcarnitine according to clause 1, the acylcarnitine analyzer including:

a measurement unit which is a tandem mass spectrometer configured to perform MRM measurement on a specimen according to at least one of MRM transitions of m/z 246>187, m/z 246>57, m/z 246>41, and m/z 246>29; and a processing unit configured to distinguish between isovalerylcarnitine and pivaloylcarnitine which is an isomer of isovalerylcarnitine in the specimen, or to determine whether or not C5 acylcarnitine (acylcarnitine having an acyl group having 5 carbon atoms) in the specimen includes pivaloylcarnitine, using a measurement result obtained by the measurement unit.

With the method for analyzing acylcarnitine according to the clause 1 or the acylcarnitine analyzer according to clause 16, it is possible to accurately distinguish between isovalerylcarnitine and pivaloylcarnitine, which are conventionally difficult to distinguish, or to accurately determine whether or not the detected C5 acylcarnitine may include pivaloylcarnitine, without performing component separation by liquid chromatograph. This can reduce false positives in screening tests for C5 acylcarnitine. When a positive result is obtained in a screening test for C5 acylcarnitine, it is possible to notify the user that the factor may be pivaloylcarnitine derived from a drug. As a result, it is possible to reduce the physical burden on a newborn infant due to the reexamination, and it is possible to reduce the psychological burden on the parents of the newborn infant who has become positive in the screening test.

(Clause 2) In the method for analyzing acylcarnitine according to clause 1, in the measurement step, a first MRM measurement for one MRM transition of m/z 246>187, m/z 246>57, m/z 246>41, or m/z 246>29 and a second MRM measurement for an MRM transition of m/z 246>85 may be performed on the specimen to acquire respective signal intensity of ions derived from C5 acylcarnitine, and in the processing step, a possibility of including pivaloylcarnitine may be evaluated based on a confirmation ion ratio which is a ratio between a signal intensity obtained by the first MRM measurement and a signal intensity obtained by the second MRM measurement.

With the method for analyzing acylcarnitine described in clause 2, regardless of whether the C5 acylcarnitine contained in the sample is isovalerylcarnitine or pivaloylcarnitine, the possibility of including pivaloylcarnitine can be evaluated based on the MRM transition (m/z 246>85) indicating almost the same ionic intensity. Therefore, the accuracy of the evaluation (including distinction or determination) in the processing step is less likely to be affected by fluctuations in the analysis conditions, fluctuations in the measurement environment, and the like, and accurate evaluation can be always performed.

(Clause 3) In the method for analyzing acylcarnitine according to clause 2, an MRM transition of the first MRM measurement may be m/z 246>187 or m/z 246>41.

Note that m/z 246>41 is an MRM transition with the largest peak intensity difference between isovalerylcarnitine and pivaloylcarnitine. Meanwhile, m/z 246>187 is an MRM transition which is much more sensitive to isovalerylcarnitine and pivaloylcarnitine than m/z 246>41. Therefore, with the method for analyzing acylcarnitine according to clause 3, the accuracy of the evaluation in the processing step can be further enhanced.

(Clause 4) In the method for analyzing acylcarnitine according to clause 1, in the processing step, an existence ratio of isovalerylcarnitine or pivaloylcarnitine contained in a target specimen may be estimated by using previously obtained information indicating a relationship between a confirmation ion ratio and an existence ratio of isovalerylcarnitine or pivaloylcarnitine in a specimen.

With the method for analyzing acylcarnitine according to clause 4, it is possible not only to simply distinguish between isovalerylcarnitine and pivaloylcarnitine, but also to estimate the existence ratio of each compound.

(Clause 5) In the method for analyzing acylcarnitine according to clause 1, in the measurement step, MRM measurement may be performed on a specimen while changing collision energy with an MRM transition of m/z 246>41 to acquire respective signal intensity of ions derived from C5 acylcarnitine, and in the processing step, a possibility of including pivaloylcarnitine may be evaluated based on collision energy dependency of ionic intensity obtained in the measurement step.

With the method for analyzing acylcarnitine according to clause 5, it is possible to determine whether or not pivaloylcarnitine is included in the detected C5 acylcarnitine, for example when the MRM measurement for an MRM transition of m/z 246>85 described above cannot be performed for some reason.

(Clause 6) In the method for analyzing acylcarnitine according to any one of clauses 1 to 5, the specimen may be introduced into the tandem mass spectrometer by using a flow injection analysis method.

With the method for analyzing acylcarnitine described in clause 6, the component separation by the column is not required, and therefore the measurement time for one specimen can be shortened, and the method is suitable for a screening test requiring rapidity.

(Clause 7) In the method for analyzing acylcarnitine according to clause 6, in the measurement step, MRM measurement may be repeatedly performed, and in the processing step, a peak top value or a peak area value of a peak indicating a temporal change in ionic intensity derived from C5 acylcarnitine may be used as the measurement result.

Using the height of the peak (peak top value) as the measurement result can increase rapid processing and can increase the efficiency of screening. Meanwhile, in general, the peak area value is more excellent in quantitativeness than the height of the peak, and thus it is possible to perform more accurate distinction and determination by using the peak area value as a measurement result.

(Clause 8) In the method for analyzing acylcarnitine according to any one of clauses 1 to 5, components contained in the specimen may be separated by liquid chromatography and introduced into the tandem mass spectrometer.

With the method for analyzing acylcarnitine described in clause 8, component separation by the column can also be used, and thus the accuracy can be further improved as compared with distinction and determination using only the measurement result of a specific MRM transition.

The method for analyzing acylcarnitine according to clause 1 and the method adopted in the acylcarnitine analyzer according to clause 16 are not limited to distinction between isovalerylcarnitine and pivaloylcarnitine, and can be widely used for distinction between acylcarnitines that have been conventionally difficult to distinguish.

(Clause 9) Another mode of the method for analyzing acylcarnitine according to the present invention is a method for analyzing acylcarnitine for distinguishing different acylcarnitines having substantially same mass using a tandem mass spectrometer, the method including:

a measurement step of performing a first MRM measurement for an MRM transition with maximum signal intensity and a second MRM measurement for an MRM transition different from the first MRM measurement on a specimen to acquire respective signal intensity of ions derived from a target acylcarnitine; and a processing step of distinguishing the different acylcarnitines or determining whether or not the target acylcarnitine in the specimen includes any of the different acylcarnitines, based on a confirmation ion ratio which is a ratio of a signal intensity obtained by the first MRM measurement to a signal intensity obtained by the second MRM measurement.

(Clause 10) In the method fix analyzing acylcarnitine according to clause 9, the different acylcarnitines may include isovalerylcarnitine and pivaloylcarnitine which is an isomer of isovalerylcarnitine.

(Clause 11) In the method for analyzing acylcarnitine according to clause 9, the different acylcarnitines may include butyrylcarnitine and isobutyrylcarnitine which is an isomer of butyrylcarnitine.

(Clause 17) Another mode of the acylcarnitine analyzer according to the present invention is an acylcarnitine analyzer capable of performing the method for analyzing acylcarnitine according to clause 9, the acylcarnitine analyzer including:

a measurement unit which is a tandem mass spectrometer configured to perform, on a specimen, a first MRM measurement for an MRM transition with maximum signal intensity and a second MRM measurement for an MRM transition different from the first MRM measurement; and a processing unit configured to distinguish different acylcarnitines having substantially same mass or to determine whether or not a target acylcarnitine in the specimen includes any of the different acylcarnitines, based on a confirmation ion ratio which is a ratio of a signal intensity obtained by the first MRM measurement and a signal intensity obtained by the second MRM measurement by the measurement unit.

As described above, herein, “different acylcarnitines having substantially same mass” may be, for example, an acylcarnitine having exactly the same mass such as an isomer, or an acylcarnitine having a different mass but having a difference that cannot be distinguished by the mass spectrometer used, for example, an acylcarnitine having the same integer mass. Isovalerylcarnitine and pivaloylcarnitine are examples of the former, and glutarylcarnitine and hydroxyhexanoylcarnitine are examples of the latter.

With the method for analyzing acylcarnitine according to clause 9 and the acylcarnitine analyzer according to clause 17, a plurality of different acylcarnitines having substantially the same mass can be accurately distinguished by using a confirmation ion ratio in which a specific product ion is used as a confirmation ion. Component separation using a column of liquid chromatograph is not required, and thus it is possible to perform rapid and efficient distinction. The above method and analyzer are particularly suitable for a screening test for congenital metabolic disorders or the like due to genetic factors.

(Clause 12) Still another mode of the method for analyzing acylcarnitine according to the present invention is a method for analyzing acylcarnitine for distinguishing different acylcarnitines having substantially same mass by using a tandem mass spectrometer, the method including:

- a measurement step of performing MRM measurement on a specimen for specific MRM transitions different from each other determined for the different acylcarnitines to acquire respective signal intensity of ions derived from a target acylcarnitine, and
- a processing step of distinguishing the different acylcarnitines, or determining whether or not the target acylcarnitine in the specimen includes any of the different acylcarnitines, based on signal intensity for a specific MRM transition obtained in the measurement step.

(Clause 13) In the method for analyzing acylcarnitine according to clause 12, the different acylcarnitines may include glutarylcarnitine and hydroxyhexanoylcarnitine.

(Clause 18) Still another mode of the acylcarnitine analyzer according to the present invention is an acylcarnitine analyzer capable of performing the method for analyzing acylcarnitine according to clause 12, the acylcarnitine analyzer including:

- a measurement unit which is a tandem mass spectrometer configured to perform MRM measurement on a specimen for specific MRM transitions different from each other determined for the different acylcarnitines; and
- a processing unit configured to distinguish different acylcarnitines having substantially same mass or to determine whether or not a target acylcarnitine in the specimen includes any of the different acylcarnitines, based on signal intensity for a specific MRM transition obtained by the measurement unit.

With the method for analyzing acylcarnitine according to clause 12 and the acylcarnitine analyzer according to clause 18, it is possible to accurately and easily distinguish a plurality of different acylcarnitines having substantially the same mass by using respective signal intensity of product ions observed peculiar to each acylcarnitine. Component separation using a column of liquid chromatograph is not required, and thus it is possible to perform rapid and efficient distinction. The above method and analyzer are particularly suitable for a screening test for congenital metabolic disorders or the like due to genetic factors.

(Clause 14) Still another mode of the method for analyzing acylcarnitine according to the present invention is a method for analyzing acylcarnitine for distinguishing different acylcarnitines having substantially same mass by using a tandem mass spectrometer, the method including:

- a measurement step of performing MRM measurement on a specimen while changing collision energy with a specific MRM transition to acquire respective signal intensity of ions derived from a target acylcarnitine; and
- a processing step of distinguishing the different acylcarnitines or determining whether or not the target acylcarnitine in the specimen includes any of the different acylcarnitines, based on collision energy dependency of ionic intensity obtained in the measurement step.

(Clause 15) In the method for analyzing acylcarnitine according to clause 14, the different acylcarnitines may include malonylcarnitine and 3-hydroxybutyrylcarnitine.

(Clause 19) Still another mode of the acylcarnitine analyzer according to the present invention is an acylcarnitine analyzer capable of performing the method for analyzing acylcarnitine according to clause 14, the acylcarnitine analyzer including:

- a measurement unit which is a tandem mass spectrometer configured to perform MRM measurement on a specimen while changing collision energy according to a specific MRM transition; and
- a processing unit configured to distinguish different acylcarnitines having substantially same mass or determine whether or not a target acylcarnitine in the specimen includes any of the different acylcarnitines, based on collision energy dependency of ionic intensity obtained by the measurement unit.

With the method for analyzing acylcarnitine according to clause 14 and the acylcarnitine analyzer according to clause 19, it is possible to accurately and easily distinguish a plurality of different acylcarnitines having substantially the same mass by using collision energy dependency of a confirmation ion ratio in which a specific product ion is a confirmation ion or collision energy dependency of signal intensity of the confirmation ion. In particular, although there are no product ions observed peculiar to each acylcarnitine or although a sufficient difference is not observed in the confirmation ion ratio under a specific collision energy, the method for analyzing acylcarnitine according to clause 12 and the acylcarnitine analyzer according to clause 18 enable appropriate distinction. Component separation using a column of liquid chromatograph is not required, and thus it is possible to perform rapid and efficient distinction. The above method and analyzer are particularly suitable for a screening test for congenital metabolic disorders or the like due to genetic factors.

REFERENCE SIGNS LIST

1 . . . Sample Introduction Unit
11 . . . Mobile Phase Container
12 . . . Liquid Supply Pump
13 . . . Injector
2 . . . Measurement Unit
201 . . . Ionization Chamber
202 . . . First Intermediate Vacuum Chamber
203 . . . Second Intermediate Vacuum Chamber
204 . . . High Vacuum Chamber
21 . . . ESI Spray
22 . . . Desolvation Tube
23 . . . Ion Guide
24 . . . Skimmer
25 . . . Multipole Ion Guide
26 . . . Front Quadrupole Mass Filter
27 . . . Collision Cell
28 . . . Rear Quadrupole Mass Filter

29 . . . Ion Detector
3 . . . Data Processor
31 . . . Data Collector
32 . . . Peak Intensity Calculator
33 . . . Component Determination Unit
4 . . . Analysis Control Unit
41 . . . Analysis Condition Storage Unit
5 . . . Central Control Unit
6 . . . Input Unit
7 . . . Display Unit

The invention claimed is:

1. A method for analyzing C5 acylcarnitine (acylcarnitine having an acyl group having 5 carbon atoms) using a tandem mass spectrometer, the method comprising:

a measurement step of performing multiple reaction monitoring (MRM) measurement on a specimen according to at least one of MRM transitions of m/z 246>57, m/z 246>41, and m/z 246>29; and a processing step of distinguishing between isovalerylcarnitine and pivaloylcarnitine which is an isomer of isovalerylcarnitine in the specimen or determining whether or not C5 acylcarnitine in the specimen includes pivaloylcarnitine, using a measurement result obtained in the measurement step.

2. The method for analyzing acylcarnitine according to claim 1, wherein the specimen is introduced into the tandem mass spectrometer by using a flow injection analysis method.

3. The method for analyzing acylcarnitine according to claim 2, wherein in the measurement step, MRM measurement is repeatedly performed, and in the processing step, a peak top value or a peak area value of a peak indicating a temporal change in ionic intensity derived from C5 acylcarnitine is used as the measurement result.

4. The method for analyzing acylcarnitine according to claim 1, wherein components contained in the specimen are separated by liquid chromatography and introduced into the tandem mass spectrometer.

5. A method for analyzing C5 acylcarnitine (acylcarnitine having an acyl group having 5 carbon atoms) using a tandem mass spectrometer, the method comprising:

a measurement step of performing multiple reaction monitoring (MRM) measurement on a specimen according to at least one of MRM transitions of m/z 246>187, m/z 246>57, m/z 246>41, and m/z 246>29; and a processing step of distinguishing between isovalerylcarnitine and pivaloylcarnitine which is an isomer of isovalerylcarnitine in the specimen or determining whether or not C5 acylcarnitine in the specimen includes pivaloylcarnitine, using a measurement result obtained in the measurement step, wherein in the measurement step, a first MRM measurement for one MRM transition of m/z 246>187, m/z 246>57, m/z 246>41, or m/z 246>29 and a second MRM measurement for an MRM transition of m/z 246>85 are performed on a specimen to acquire respective signal intensity of ions derived from C5 acylcarnitine, and in the processing step, a possibility of including pivaloylcarnitine is evaluated based on a confirmation ion ratio which is a ratio between a signal intensity obtained by the first MRM measurement and a signal intensity obtained by the second MRM measurement.

6. The method for analyzing acylcarnitine according to claim 5, wherein an MRM transition of the first MRM measurement is m/z 246>187 or m/z 246>41.

7. The method for analyzing acylcarnitine according to claim 5, wherein in the processing step, an existence ratio of isovalerylcarnitine or pivaloylcarnitine contained in a target specimen is estimated by using previously obtained information indicating a relationship between a confirmation ion ratio and an existence ratio of isovalerylcarnitine or pivaloylcarnitine in a specimen.

8. A method for analyzing C5 acylcarnitine (acylcarnitine having an acyl group having 5 carbon atoms) using a tandem mass spectrometer, the method comprising:

a measurement step of performing multiple reaction monitoring (MRM) measurement on a specimen according to at least one of MRM transitions of m/z 246>187, m/z 246>57, m/z 246>41, and m/z 246>29; and a processing step of distinguishing between isovalerylcarnitine and pivaloylcarnitine which is an isomer of isovalerylcarnitine in the specimen or determining whether or not C5 acylcarnitine in the specimen includes pivaloylcarnitine, using a measurement result obtained in the measurement step, wherein in the measurement step, MRM measurement is performed on a specimen while changing collision energy with an MRM transition of m/z 246>41 to acquire respective signal intensity of ions derived from C5 acylcarnitine, and in the processing step, a possibility of including pivaloylcarnitine is evaluated based on collision energy dependency of ionic intensity obtained in the measurement step.

* * * * *